(12) United States Patent
Jacoves et al.

(10) Patent No.: US 7,653,571 B2
(45) Date of Patent: *Jan. 26, 2010

(54) SYSTEM AND METHOD FOR GENERATING PRICE-PER-GALLON DISCOUNTS FOR FUEL

(75) Inventors: Peter G. Jacoves, Dallas County, TX (US); William Y. Hall, Frisco, TX (US); Karla J. Mains, Rowlette, TX (US); Charles H. Naul, Irving, TX (US)

(73) Assignee: Excentus Corporation, Irving, TX (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/157,578

(22) Filed: Jun. 21, 2005

(65) Prior Publication Data

US 2005/0234776 A1 Oct. 20, 2005

Related U.S. Application Data

(63) Continuation of application No. 09/183,791, filed on Oct. 30, 1998, now abandoned.

(60) Provisional application No. 60/082,927, filed on Apr. 24, 1998.

(51) Int. Cl.
*G06Q 30/00* (2006.01)

(52) U.S. Cl. .............................. 705/14; 705/26; 705/27; 235/275; 235/375; 235/380; 235/381; 235/382; 235/383

(58) Field of Classification Search .................. 705/14, 705/26, 27; 235/275, 375, 380, 382, 381, 235/383

See application file for complete search history.

(56) References Cited

U.S. PATENT DOCUMENTS 3,536,109 A 10/1970 Ginsburgh (Continued)

FOREIGN PATENT DOCUMENTS

DE 40 13 147 A1 10/1991

(Continued)

OTHER PUBLICATIONS

Hisey, "Storming the store Card Gates" : Jul. 1997.*

(Continued)

*Primary Examiner*—Jean D. Janvier
(74) *Attorney, Agent, or Firm*—Fulbright & Jaworski L.L.P.

(57) ABSTRACT

A fuel rewards program wherein awards received from the purchase of discount-triggering items at a first transaction are redeemed for a price-per-unit (PPU) discount on fuel. A scanner scans product codes and inputs the information to a POS system through a comparator such that a product may be determined to be a discount-triggering item. Information regarding the discount-triggering item is first stored in a potential buffer. A rewards process processes the information in the potential buffer and stores that information in a filtered potential buffer. A potential file accumulates basic information about one or more transactions. A purchase buffer stores all of the information, which is ultimately printed on a cash register receipt. The receipt may be scanned at a fuel dispenser to begin the redemption of the PPU discount on the fuel.

8 Claims, 12 Drawing Sheets

| ITEM | MINIMUM QUANTITY | MAXIMUM QUANTITY | DISCOUNT PER UNIT |
|---|---|---|---|
| A | 2 | 5 | 0.20 |
| B | 4 | 8 | 0.05 |
| C | 1 | 4 | 0.10 |
| D | 3 | 10 | 0.15 |
| E | 1 | 5 | 0.12 |
| F | 1 | 5 | 0.13 |

MAXIMUM DISCOUNT PER GALLON: 0.75

U.S. PATENT DOCUMENTS

| | | | |
|---|---|---|---|
| 3,627,991 A | 12/1971 | Beall et al. | |
| 3,660,858 A | 5/1972 | Smith Jr. | |
| 3,786,421 A | 1/1974 | Wostle et al. | |
| 3,852,576 A | 12/1974 | Rudd | |
| 3,931,497 A | 1/1976 | Gentile et al. | |
| 4,199,100 A | 4/1980 | Wostle et al. | |
| 4,345,146 A | 8/1982 | Story et al. | |
| 4,396,902 A | 8/1983 | Warthan et al. | |
| 4,469,149 A | 9/1984 | Walkey et al. | |
| 4,723,212 A | 2/1988 | Mindrum et al. | |
| 4,792,018 A | 12/1988 | Humble et al. | |
| 4,821,186 A | 4/1989 | Munakata et al. | |
| 4,825,045 A | 4/1989 | Humble | |
| 4,881,581 A | 11/1989 | Hollerback | |
| 4,910,672 A | 3/1990 | Off et al. | |
| 4,914,279 A | 4/1990 | Massey | |
| 4,949,256 A | 8/1990 | Humble | |
| 5,008,519 A | 4/1991 | Cunningham et al. | |
| 5,025,372 A | 6/1991 | Burton et al. | |
| 5,056,019 A | 10/1991 | Schultz et al. | |
| 5,173,851 A | 12/1992 | Off et al. | |
| 5,185,695 A | 2/1993 | Pruchnicki | |
| 5,200,889 A | 4/1993 | Mori | |
| 5,202,822 A | 4/1993 | McLaughlin et al. | |
| 5,202,826 A | 4/1993 | McCarthy | |
| 5,260,552 A | 11/1993 | Colbert et al. | |
| 5,299,135 A | 3/1994 | Lieto et al. | |
| 5,327,066 A | 7/1994 | Smith | |
| 5,336,871 A | 8/1994 | Colgate, Jr. | |
| 5,340,969 A | 8/1994 | Cox | |
| 5,368,129 A | 11/1994 | Von Kohorn | |
| 5,393,966 A | 2/1995 | Gatto et al. | |
| 5,420,606 A | 5/1995 | Begum et al. | |
| 5,422,744 A | 6/1995 | Katz et al. | |
| 5,481,094 A | 1/1996 | Suda | |
| 5,483,049 A | 1/1996 | Schulze et al. | |
| 5,493,315 A | 2/1996 | Atchley | |
| 5,500,890 A | 3/1996 | Rogge et al. | |
| 5,502,636 A | 3/1996 | Clarke | |
| 5,506,395 A | 4/1996 | Eppley | |
| 5,514,858 A | 5/1996 | Ackley | |
| 5,521,364 A | 5/1996 | Kimura et al. | |
| 5,531,482 A | 7/1996 | Blank | |
| 5,545,883 A | 8/1996 | Sason et al. | |
| 5,548,106 A | 8/1996 | Liang et al. | |
| 5,555,497 A | 9/1996 | Helbling | |
| 5,602,745 A | 2/1997 | Atchley et al. | |
| 5,612,868 A | 3/1997 | Off et al. | |
| 5,659,431 A | 8/1997 | Ackley | |
| 5,679,945 A | 10/1997 | Renner et al. | |
| 5,694,326 A | 12/1997 | Warn et al. | |
| 5,700,999 A | 12/1997 | Streicher et al. | |
| 5,710,886 A | 1/1998 | Christensen et al. | |
| 5,729,002 A | 3/1998 | Samples | |
| 5,739,760 A | 4/1998 | Hatakeyama | |
| 5,790,410 A | 8/1998 | Warn et al. | |
| 5,797,470 A | 8/1998 | Bohnert et al. | |
| 5,806,045 A | 9/1998 | Biorge et al. | |
| 5,822,735 A | 10/1998 | De Lapa et al. | |
| 5,832,457 A * | 11/1998 | O'Brien et al. | 705/14 |
| 5,832,458 A | 11/1998 | Jones | |
| 5,845,095 A | 12/1998 | Reed et al. | |
| 5,862,222 A | 1/1999 | Gunnarsson | |
| 5,895,457 A | 4/1999 | Kurowski et al. | |
| 5,901,303 A | 5/1999 | Chew | |
| 5,905,246 A | 5/1999 | Fajkowski | |
| 5,913,180 A | 6/1999 | Ryan | |
| 5,980,090 A | 11/1999 | Royal, Jr. et al. | |
| 6,013,107 A | 1/2000 | Blackshear et al. | |
| 6,039,245 A | 3/2000 | Symonds et al. | |
| 6,062,473 A | 5/2000 | Blalock et al. | |
| 6,070,156 A | 5/2000 | Hartsell, Jr. | |
| 6,073,840 A | 6/2000 | Marion | |
| 6,085,333 A | 7/2000 | DeKoning et al. | |
| 6,089,284 A | 7/2000 | Kaehler et al. | |
| 6,092,057 A | 7/2000 | Zimmerman et al. | |
| 6,098,879 A | 8/2000 | Terranova | |
| 6,112,981 A * | 9/2000 | McCall | 235/375 |
| 6,152,591 A | 11/2000 | McCall et al. | |
| 6,193,154 B1 | 2/2001 | Phillips et al. | |
| 6,263,319 B1 | 7/2001 | Leatherman | |
| 6,298,329 B1 | 10/2001 | Walker et al. | |
| 6,351,735 B1 | 2/2002 | Deaton et al. | |
| 6,813,609 B2 * | 11/2004 | Wilson | 705/14 |
| 2001/0020198 A1 | 9/2001 | Wilson | |

FOREIGN PATENT DOCUMENTS

| | | |
|---|---|---|
| EP | 0 114 4477 A1 | 8/1984 |
| EP | 0 356 243 A2 | 2/1990 |
| EP | 0 511 463 A2 | 11/1992 |
| GB | 2279795 A | 1/1995 |
| JP | 2217998 | 8/1990 |
| JP | 7-200754 | 8/1995 |
| JP | 9-251521 | 9/1997 |
| WO | WO 91/18373 | 11/1991 |
| WO | WO 92/14213 | 8/1992 |
| WO | WO 94/09457 | 4/1994 |
| WO | WO 96/06415 | 2/1996 |
| WO | WO 96/42061 | 12/1996 |
| WO | WO 99/14715 | 3/1999 |

OTHER PUBLICATIONS

"Ontario's leading grocery chains are competing with promotional tie-ins with major oil companies, which are trying to boost declining gasoline sales": Supermarket News-p. 4: Sep. 6, 1982.*
Barbara Grondin Francella, "Anybody's Fuel", *Convenience Store News*, p. 31, Jul. 7, 1997.
"Grocery-Gas Combo Opened by Nexus Fuel, 2,000 Planned in Five Years", *The Food Institute Report*, v70, n32, Aug. 11, 1997.
John Callanan, "New Realities in Gasoline Marketing", *Convenience Store News*, p. 50, Dec. 15, 1997.
"Midland's Subsidiary, Arcon Energy, Inc. Sets Up a New Division", Business Wire, p. 04071444, Apr. 7, 1998.
Phil Womack, "Regulations Changing Fuel Management Options", *Beton Rouge Business Report*, v10, n12, p21(3), Jan. 28, 1992.
"US-Tower Records Launches Cross Promotion", *Billboard (BBD)*, Ginger Roberts—Search Report, p. 44, Feb. 20, 1993.
"Sony and Coca-Cola in Cross-Promo Link-up", *Gale Grouop*, Ginger Roberts—Search Report, p. 4, 79, Mar. 16, 1991.
Estelle Jackson, "Area Oil Films Offer Plans for Guaranteed Prices", *Richmond Times-Dispatch*, City Section: Business, p. E-1, Jul. 14, 1991.
U.S. Appl. No. 60/184,185.
U.S. Appl. No. 09/249,842.
U.S. Appl. No. 10/320,724.
Jul. 8, 1997 facsimilie to Don Krone @Dunigan Fuels from Anie Krause at Fleming regarding Fleming/CFG Petoleum Market Plan dated Jul. 2, 1007, 20 pages.
Affidavit fo G. Randy Nicholson dated Dec. 18, 2008, 44 pages.
Shockey, Don, "Automated Pumps New Krown Jewel," The Sunday Oklahoman, Feb. 26, 1989, 1 page.
Braykovich, Mark, "Want Gas? Bighgs Sells That Too," The Cincinnati Enquirer, Oct. 4, 1989, 1 page.
Financial Marketing Consultants, Inc. presentation regarding Known Systems, 4 pages.
Affidavit of Don Krone dated Apr. 27, 2006, 37 pages.
Fuel Incentives External Design Specification, Revision 2, Sep. 22, 2999, Catalina Marketing Corporation, 9 pages.
Grocery Fuel System Installation Manual, Convenient Fuel Group, Version .01, Aug. 1, 1998, 20 pages.
"CFG and Gilbarco," Gilbarco Press Release, Feb. 25, 1999, 2 pages.
"Profit Center 2000 The In-Store marketing program is the competitive advantage," CFG (Convenient Fuel Group), 8 pages.

Convenient Fuels Group System Operation Manual, Version .01, May 10, 1998, 18 pages.
USPTO Disclosure Document dated Apr. 27, 1998, 6 pages.
Krone, Donald et al., "Apparatus for Control and Reporting of Motor Fuel Sales," draft utility patent application, 15 pages.

Convenient Fuel Group video on DVD, date of file saved to DVD indicated as May 4, 2000 per metadata on disk.

* cited by examiner

| ITEM | MINIMUM QUANTITY | MAXIMUM QUANTITY | DISCOUNT PER UNIT |
|---|---|---|---|
| A | 2 | 5 | 0.20 |
| B | 4 | 8 | 0.05 |
| C | 1 | 4 | 0.10 |
| D | 3 | 10 | 0.15 |
| E | 1 | 5 | 0.12 |
| F | 1 | 5 | 0.13 |
| | | MAXIMUM DISCOUNT PER GALLON | 0.75 |

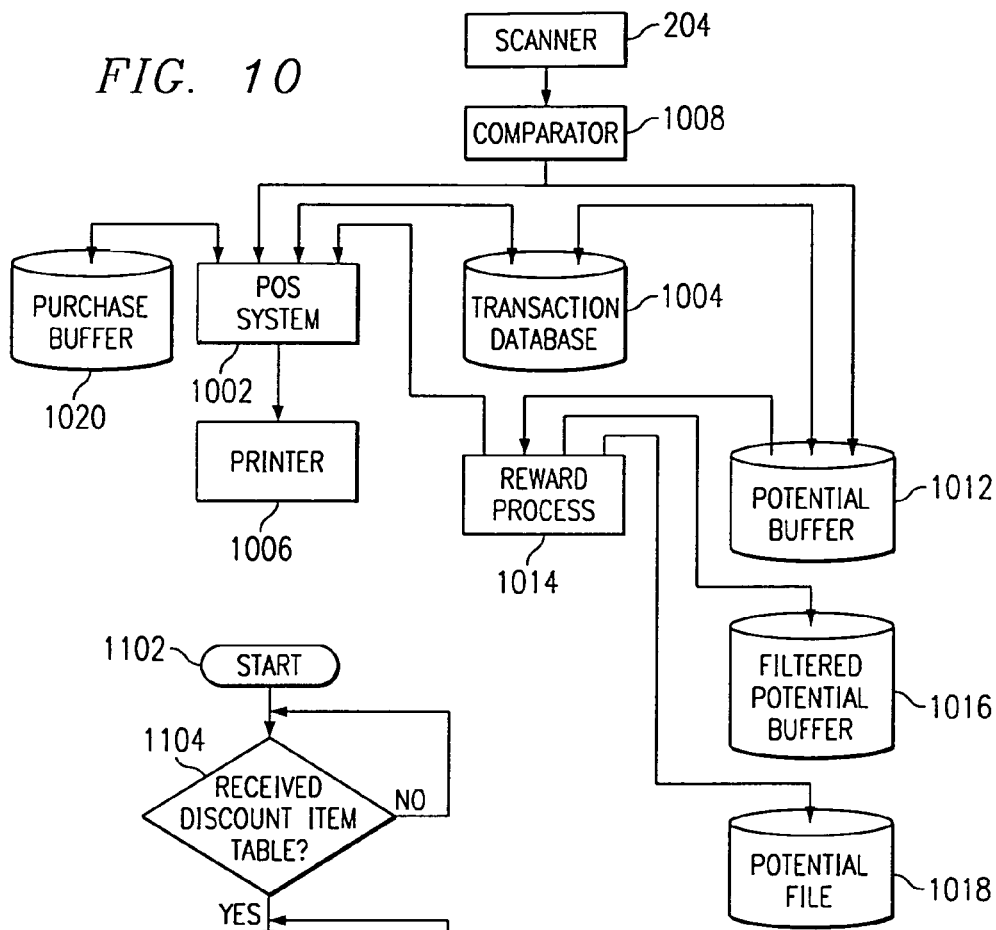
FIG. 10
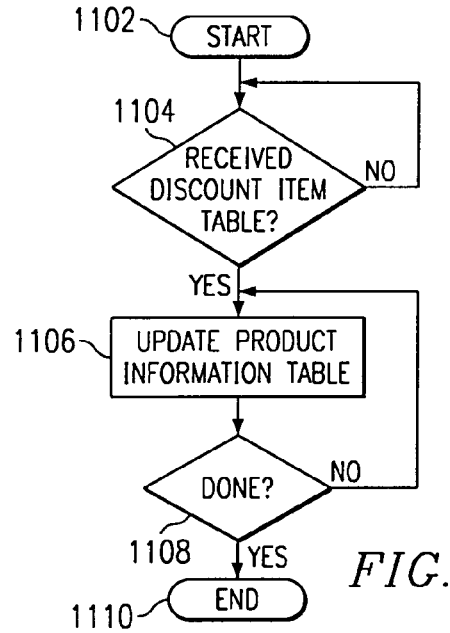
FIG. 11
| DISCOUNT ITEM TABLE | | | | |
|---|---|---|---|---|
| UPC | DISCOUNT | MIN QTY | MAX QTY | STORE CHAIN |
| | | | | |
| | | | | |
| | | | | |
| | | | | |
FIG. 12

212

FUEL REWARD RECEIPT
STORE NAME AND LOCATION

| Qty | Item | Award Amount |
|---|---|---|
| 2 | 0268000123 AB SPAGHETTI | .48 |
| 3 | 01200000917 PEPSI DIET | 1.08 |
| 3 | 01200000921 MOUNTAIN DEW | 1.08 |
| 5 | 04492809504 PASTA SAUCE | 2.40 |
| 2 | 04400004697 MINI CHIPS AHOY | .72 |
| 1 | 04123500055 RELISH TOMATO | .24 |
| 2 | 02325464221 HONEY GRAMAMS | .72 |
| 1 | 02100000130 JELLY | .36 |
| 2 | 02550080032 FOLGERS DECAF | 1.20 |
| 2 | 05100000014 CAMPBELLS SOUP | .48 |
| 2 | 05100000544 CAMPBELLS SOUP | .48 |
| 1 | 05100000543 CAMPBELLS BROTH | .36 |

AWARD VALUE THIS RECEIPT    9.60

(MAXIMUM AWARD POSSIBLE – $9.60)

VARIABLE TEXT HERE VARIABLE TEXT HERE VARIABLE TEXT HERE VARIABLE TEXT HERE

EXPIRES XX/XX/XX

SEE STORE CIRCULAR FOR DETAILS

FUEL CREDIT VOUCHER

GAS STATION NAME
STORE NUMBER AND LOCATION

AMOUNT OF GAS PURCHASED    6.00

GAS AWARD VALUE CREDIT    −9.60

GAS CREDIT RECEIPT VALUE    3.60

THIS GAS CREDIT RECEIPT CAN ONLY BE USED FOR A DISCOUNT ON GAS PURCHASED AT THIS STATION.

OTHER VARIABLE TEXT HERE OTHER VARIABLE TEXT HERE OTHER VARIABLE TEXT HERE

EXPIRES XX/XX/XX

SEE STORE CIRCULAR FOR DETAILS

*FIG. 22*

SYSTEM AND METHOD FOR GENERATING PRICE-PER-GALLON DISCOUNTS FOR FUEL

CROSS-REFERENCE TO RELATED APPLICATION

This nonprovisional application is a continuation of U.S. patent application Ser. No. 09/183,791 filed Oct. 30, 1998 now abandoned for "Fuel Reward Program System", which claims priority from U.S. Provisional Application No. 60/082,927 filed Apr. 24, 1998.

The present application is a Continuation-in-Part of U.S. Provisional Patent Application Ser. No. 60/082,927, entitled "FUEL REWARD PROGRAM SYSTEM" filed on Apr. 24, 1998, and is co-pending with U.S. patent application Ser. No. 09/183,788, entitled, "METHOD FOR PROCESSING INFORMATION THROUGH CLEARINGHOUSE", filed of even date herewith.

TECHNICAL FIELD OF THE INVENTION

This invention relates generally to point of sales cash registry systems, and particularly to a point of sale cash registry system program for crediting discounts from grocery purchases towards gasoline purchases.

BACKGROUND OF THE INVENTION

Prior art point of sale coupon reward systems have been used for promoting products by providing customers with preprinted discount coupons which are credited to consumers based upon purchases of particular products. Prior art coupon reward systems have primarily been of one of two types. The first type provides document coupons that are essentially printed paper coupons that provide redeemable slips having a particular face discount amount for purchase of a product being promoted. This first type of coupon is presented at the point of sale of the product, which the coupon is directed toward promoting, for receipt of the discount at the location of the point of sale at the time when the promoted product is being purchased. Prior art discount coupon systems require presentation of discount coupon documents at the time of and at the point of purchase, and each of the amounts of each of the discount coupon documents must be manually entered or scanned into the register at the time of purchase. Each discount is separately applied, on a per product basis, with the purchase of each product and the presentation of the discount coupon documents.

The second primary of type discount coupon reward systems are provided by electronic coupon systems. Prior art electronic discount coupon systems are typically electronically computed promotional discounts which are applied at the point of purchase when the particular article is purchased. Such electronic discounts typically have a published or posted discounted price which is displayed on a product stocking shelf and then applied to the product at the point of purchase of that particular product. Electronic discount systems automatically apply the coupon discount to the purchased total which is calculated at the time of purchase of the promoted product for which the discount is granted. Each discount is separately applied according to a data listing of discounts, on a per product basis, with the purchase of each product.

SUMMARY OF THE INVENTION

The present invention disclosed and claimed herein is directed towards a discount credit accumulation system in which a discount for a discountable item is based on the purchase of a discount triggering item. The discount triggering items are discriminated from non-discount triggering items in a purchase of multiple items, each of the discount triggering items having a unique code associated therewith and an associated discount value. The discount triggering items are grouped in bundles where each bundle comprises all of the ones of the determined discount triggering items having the same unique code such that there is provided a bundle for each of the unique codes being present in the purchase of the multiple items and wherein each bundle has a provided total comprising the product of the number of discount triggering items in an associated bundle times the discount associated therewith. The bundled award values are totaled to provide a single discount for the discountable item.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed diagrammatic view of one embodiment of the fuel reward system operating in conjunction with the POS system;

FIG. 11 illustrates a flowchart for creating the store product information table;

FIG. 12 illustrates a diagrammatic view of the discount item table;

FIG. 21 illustrates a fuel rewards receipt;

FIG. 22 illustrates a customer credit receipt;

DETAILED DESCRIPTION OF THE INVENTION

Figures 1, 2:
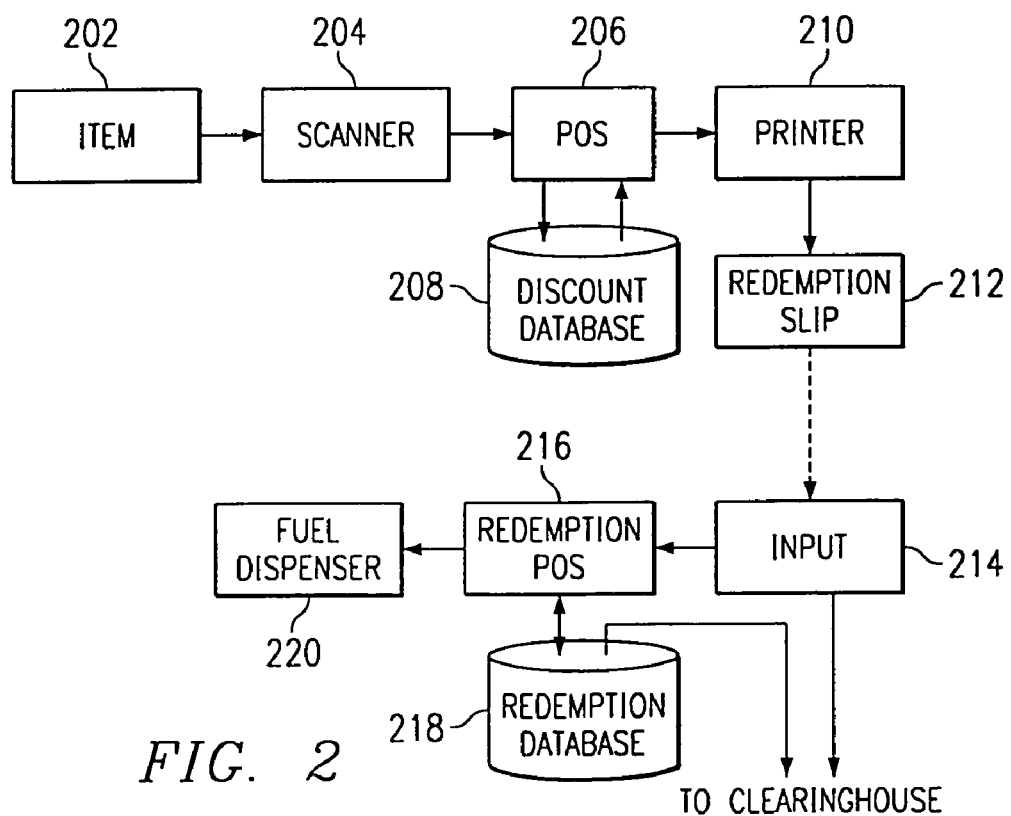
FIG. 1 illustrates a top view of a program announcement of the fuel reward program system of the present invention.
FIG. 2 illustrates an overall top level block diagram of the fuel rewards program as implemented with a Point-of-Sale (POS) system.

Referring now to FIG. 1, there is illustrated a listing of products and discounts of a fuel reward program system, which comprises a program announcement 100. The program announcement 100 sets forth various terms of the fuel reward program system. The program announcement 100 may be any of a plurality of forms, such as separable slips originally held in booklet form for individual removal from the booklet, individual fliers which are pre-separated, discount boards which are viewable in various areas of the store, or monitor display screens which are mounted to shopping carts for viewing by persons utilizing the carts. The program announcement 100 preferably lists a plurality of discount triggering items in column 102, a respective minimum quantity in column 104 which must be purchased to obtain the discount, a respective maximum quantity per unit item in column 105 for which a discount will be awarded, and a respective unit discount per unit item in column 106. For example, a particular type of soda "D" will have a unit discount of fifteen cents discount per gallon of gasoline for each unit of soda "D" being purchased, provided a minimum of three units of the soda "D" are purchased. A maximum discount per gallon total 108 for all of the trigger products listed is equal to the sum of the discount per unit items 106. Preferably, the maximum discount per gallon total 108 for the trigger products listed on the program announcement 100 will be equal to the price per gallon of gasoline. In some embodiments, a purchaser's maximum per gallon discount total 108 could exceed the price per gallon of the gasoline, such that the purchaser could receive either a monetary payment or a credit based on a discount credit which exceeds the price per gallon of gasoline.

Referring now to FIG. 2, there is illustrated a top level block diagram for the fuel rewards program of the disclosed embodiment. In this embodiment, an item 202 that is to be purchased by the consumer is scanned by a scanner 204. This purchased item 202 can be any type of staple product and it could be one of the discount triggering items. The output of the scanner 204 is input to the Point-of-Sale (POS) system 206 which generally constitutes the heart of the store's operation. This POS system 206 controls all input and output of items and is generally associated with a central database (not shown). The POS system 206, in addition to being associated with a central database, is also associated with a discount database 208 which may or may not be an integral part of the central database, but which will be considered a separate database for discussion purposes. The discount database 208 contains therein information associated with discount triggering items. Whenever a discount triggering item is scanned by the scanner 204, the POS 206 recognizes this and determines what discount is to be associated with the discount triggering item. The POS system 206 will then create information regarding a total credit that is to be provided for a discountable product which can then be output to a printer 210 for creation of a redemption slip 212. The redemption slip 212 will be described in more detail hereinbelow; however, it basically contains information as to the discount triggering items that have been purchased, the number thereof, and also the discount associated with each type of product. A total discount will also be provided in addition to other information.

Redemption slip 212 is then provided to the customer and the customer can then take it to another location for the purpose of purchasing a discounted product. In the disclosed embodiment, this discounted product is fuel. However, it should be understood that any type of discountable product could be associated with the redemption slip 212 and, in fact, the redemption slip 212 could be "redeemed" at the same location as the purchased items. In the disclosed embodiment, however, the redemption slip 212 is typically redeemed at a different location, that is associated with fuel.

The purchaser takes the redemption slip 212 to the location of the discounted product at a later time and this is then input through an input device 214 to a redemption POS 216. In some situations, the redemption POS 216 and the POS 206 are different, the most common situation, but the redemption POS 216 and the POS 206 could be a common system. Once processed by the redemption POS 216, the discount associated with the redemption slip 212 is determined and that information associated with the input of the redemption slip 212 is stored in a redemption database 218. The discount is applied and then the discounted product is purchased (or purchased and then applied), which in the disclosed embodiment is associated with a fuel dispenser 220. The information from the redemption database and the input device 214 is then forwarded to a clearinghouse, this being electronic information in the case of the redemption database 218, and the actual redemption slip 212 in the case of the input device 214. The clearinghouse will then take the information provided on the redemption slip 212 and invoice the particular manufacturer associated with each type of discount triggering item and then send a check for the appropriate amount to the store once the invoice is paid.

Figure 3A:
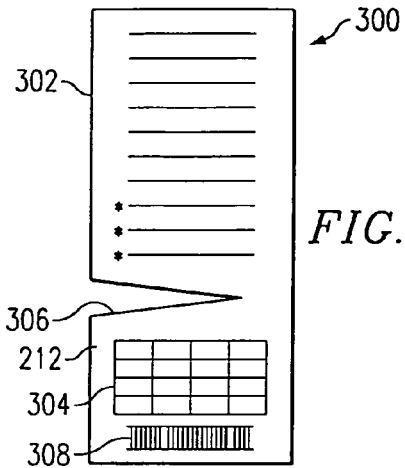
FIG. 3a illustrates a top view of a receipt comprising a redemption slip of the fuel reward program system of the present invention.

Referring now to FIG. 3a, there is illustrated a top view of a purchase receipt 300 comprising an upper portion 302 and the redemption slip 212. The receipt 300 is preferably of a type of which is commonly generated and printed at conventional registers used at points of sale in grocery stores. The upper portion 302 comprises an itemized listing of purchased products at the first point of sale and a purchase total. The listed purchased products comprise standard non-triggering items, and triggering items which can be notated with an asterisk (*). The discount triggering items are notated for the purpose of indicating to the clerk that if the product is returned, special attention can be given to properly record the return transaction. The redemption slip 212 of the receipt 300 is partially separated from the upper portion 302 of the receipt 300 by a partial slice 306, or in some embodiments perforations, such that after dispensing from a register, the redemption slip 212 is easily separable from the upper portion 302 of the receipt 300 by a gentle tug. In the preferred embodiment, the slice 306 extends transversely to the longitudinal axis of the receipt 300, and substantially across the width of receipt 300, to almost completely separate the upper portion 302 of the receipt 300 from the redemption slip 212. The makeup of redemption slip 212 will be described in greater detail hereinbelow, but essentially comprises a printout 304 of information regarding the discount triggering items which were purchased for that particular transaction. The redemption slip 212 can also include a bar code 308 which permits easy scanning and input of information at a subsequent redemption event, explained in greater detail hereinbelow.

Figure 3B:
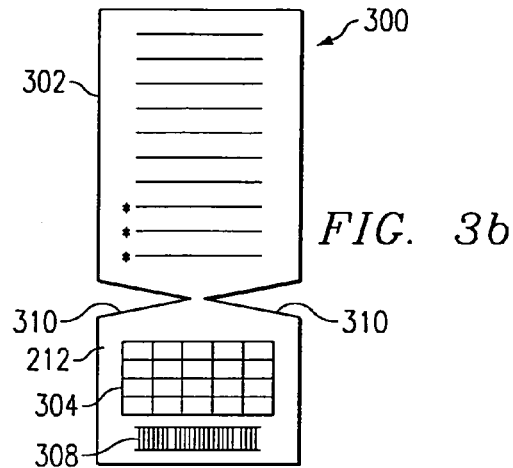
FIG. 3b illustrates a top view of a receipt comprising a redemption slip of the fuel reward program system of the present invention, using an alternative slice method.

Referring now to FIG. 3b, there is illustrated a top view of purchase receipt 300 with an alternative style of slice. In this embodiment, the redemption slip 212 of the receipt 300 is separated from the upper portion 302 by two partial slices 310 which extend transversely into opposite sides of the receipt 300, perpendicular to the longitudinal length of the receipt 300, and almost completely separating the upper portion 302 from the redemption slip 212.

Figure 4:
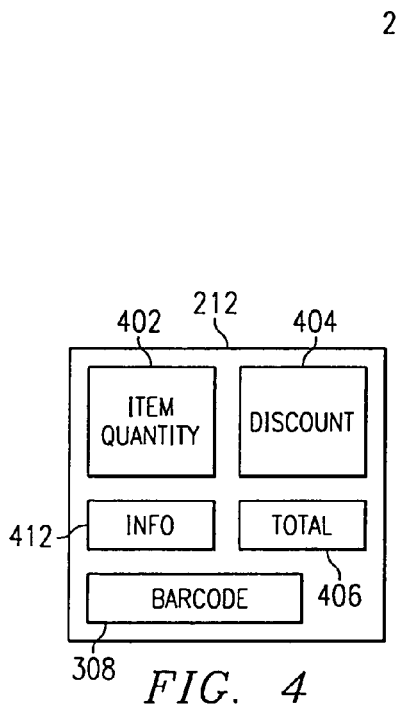
FIG. 4 illustrates the general layout of the redemption slip of the present invention.

Referring now to FIG. 4, there is illustrated a top view of the redemption slip 212, which is detached from the purchase receipt 300 set forth hereinabove with respect to FIGS. 3a and 3b. The redemption slip 212 has specific information contained therein. It will contain one field 402 which is associated with the items that are purchased, and the quantity of those items which will be associated with a second field 404, defining the total discount for each item. For example, if a user bought a cola product from a single manufacturer, this would be associated on the redemption slip, in addition to a text description of the cola product, with a defined Universal Product Code (UPC), and that particular product will have the quantity associated therewith and the total discount associated there within a field 406. In addition, the redemption slip 212 has associated therewith a bar code 308, which bar code 308 provides information regarding the contents of all fields on the redemption slip 212 that allows the redemption slip 212 to be "scanned" with the input device 214, or manually input. There is also provided a field 412 for miscellaneous information which can be in the form of text information, store code information, unique slip ID, etc.

Figure 5:
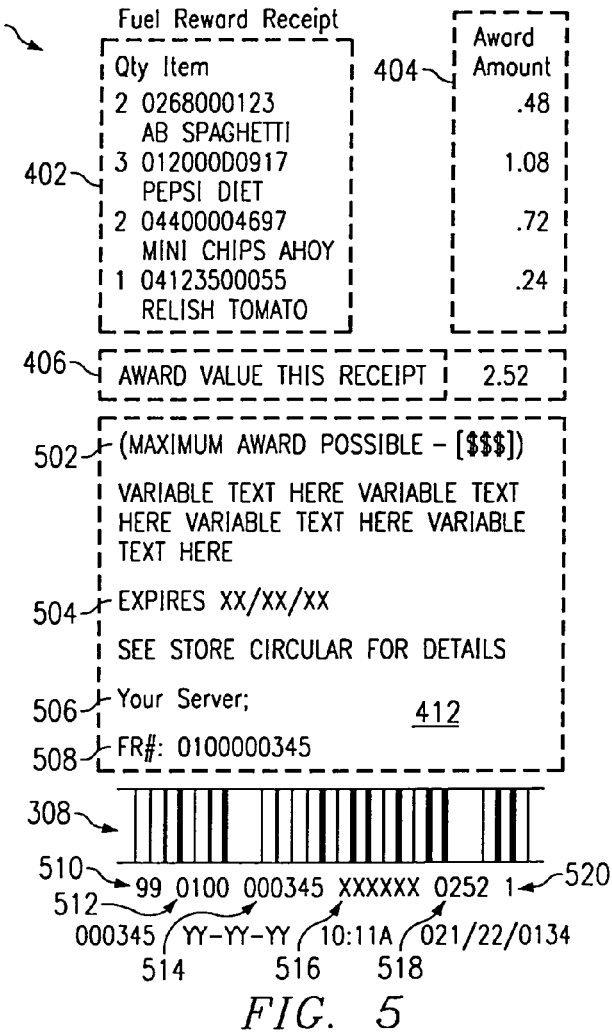
FIG. 5 illustrates a more detailed view of the redemption slip of FIG. 4.

Referring now to FIG. 5, there is illustrated a more detailed top view of the redemption slip 212. The information contained within the item field 402 is arranged in two columns, one for quantity and one for the actual item. The quantity determines how many items associated with the item column were purchased. As described hereinabove, each item is defined by its UPC code and a description thereof. In the embodiment illustrated, the first item has a UPC code which is ten characters in length. The item field 402 has contained therein, for example, one item with a UPC code "0268000123" with a descriptor "AB spaghetti" with an associated total discount for that item illustrated in FIG. 4 of $0.48. Therefore, the discount per unit item would be $0.24 if only one were purchased. Therefore, even though there were two items purchased, there is only a single award amount, a discount amount that is associated with that particular item. This is what is referred to as "bundling," wherein all the items purchased for a particular discount triggering item would have only a single discount amount associated therewith. This is important, as will be described hereinbelow, since the clearinghouse really only needs to know the UPC, and the total award or discount associated with that discount triggering item. The total discount is required for the store in order to determine the discount provided; however, for the purposes of the clearinghouse, it is important that each particular item for each particular UPC be bundled to show all of the discount bearing products for that particular UPC that were purchased and the total discount therefore. As also will be described hereinbelow, a minimum quantity and a maximum quantity may be provided whereby the consumer must purchase the minimum before the discount is triggered, but no more than the maximum.

In the information field 412, there are provided a number of fields therein. There is provided one line 502 which basically sets the maximum award or discount possible. Each store basically is allowed to set the maximum discount that they will provide such that they will only provide the discount based upon, for example, one gallon of gas for a maximum of, for example, twelve gallons. Therefore, there will only be a maximum amount allowed.

There can be a number of methods by which the discount is applied. For example, the maximum award can be defined in the total discount available, which discount is based upon a discount per gallon. Therefore, the discount may be $0.20 per gallon with a maximum $2.40 such that only twelve gallons of gas can have discount applied thereto. The alternate approach, the one set forth in the disclosed embodiment, is to provide a discount based upon the items purchased. This discount will be less than a maximum which is set to, for example, so many cents per gallon times a maximum number of gallons. If, for example, the store determined that they would only provide a discount of $0.30 per gallon for a maximum of twelve gallons, they would only allow a maximum award of $3.60 even though more than twelve gallons was purchased. This, of course, would require that the amounts in the award amount field 404 be adjusted.

A further line in information field 412, line 504 sets an expiration date for the redemption slip 212. This lets the user know that they can not redeem the benefits of this redemption slip 212 after that date. Of course, it should be understood that the clearinghouse never gets the redemption slip 212 or the information from the redemption database 218 until the redemption slip 212 has been "redeemed."

Another line in the information field 412 is a line 506 that defines the server, i.e., the individual running the scanner 204, and a line 508 provides a multi-digit value that sets forth a combination number for the store and a unique ID (UID) for the particular order. As will be set forth hereinbelow, each transaction, which results in the generation of a redemption slip 212, has associated therewith a UID. This is for the purpose of maintaining a database of overall transactions and generated redemption slips 212. All of this information is contained in the bar code 308. The bar code 308, as is conventional with a bar code, has multiple regions stored therein. One field 510 provides the type of coupon that is associated with the redemption slip 212, in this case it is a fuel reward coupon. However, the value of this field 510 could be changed and it could be for some other associated discounted product. A second field 512 is associated with the unique store code, a field 514 has the UID of the transaction, a field 516 has the expiration date, a field 518 has the total discount, and a field 520 is a unique flag. The unique flag can have a value of "1" or "2" which flag indicates to the store that this is a first or second transaction associated with the redemption slip 212. The first transaction of a redemption slip 212 represents the process of redeeming the discount for less than the total amount. If this occurs, then a second redemption slip may be generated which has a bar code associated therewith indicating all of the information of the bar code with the exception that the total discount is less, i.e., the unused portion of the original redemption slip 212. The bar code for this newly-generated intermediate redemption slip would have a "2" in the flag field 520. Of course, the intermediate redemption slip would not have the field 402 and the field 404 associated therewith, as this would not be required. It would merely have another bar code with a discount associated therewith, an expiration date, a UID, a store number, and a type of transaction, as set forth in field 510.

Figure 6:
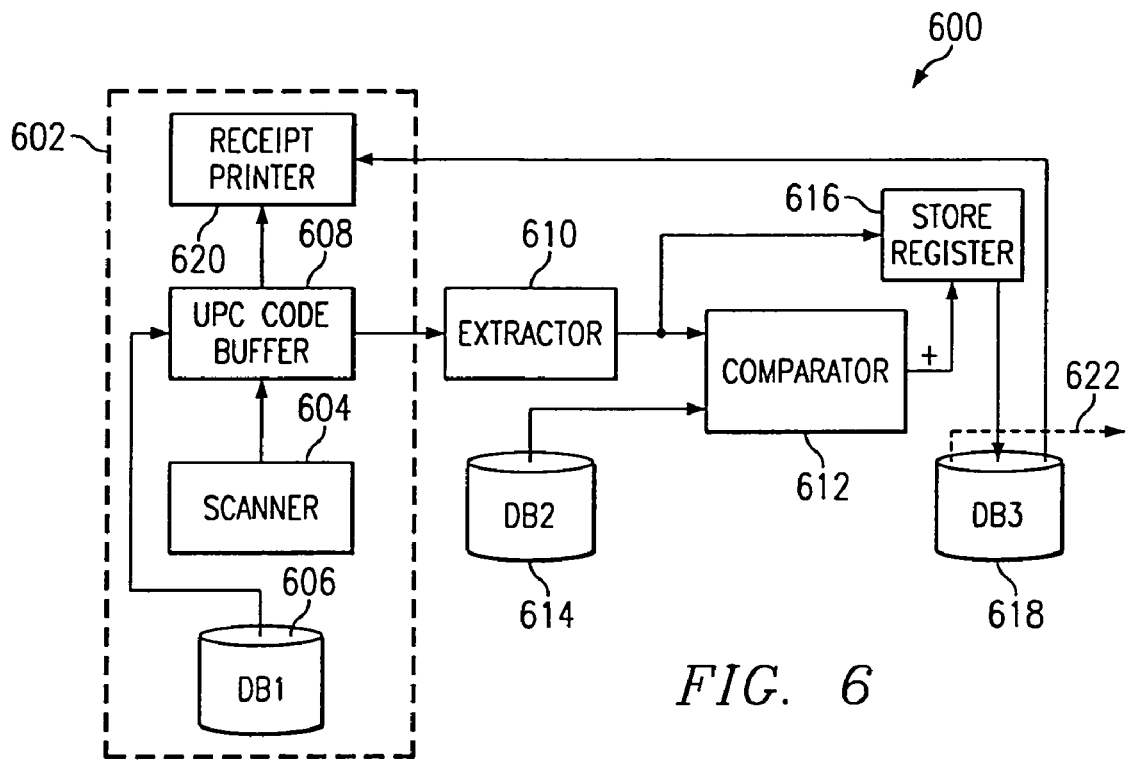
FIG. 6 illustrates the first portion of a data processing system for use at a first point of sale of promoted products according to the present invention.

Referring now to FIG. 6, there is illustrated schematic diagram of a first portion of a data processing system 600 according to the present invention. The data processing system 600 includes a point-of-sale register system 602. The point-of-sale register system 602 comprises a UPC code scanner 604 and a first database 606. The database 606 includes information which correlates UPC codes to units prices. Also included in the point-of-sale register system 602 is a UPC code buffer 608 for storing scanned UPC codes. The UPC code buffer 608 is connected to an extractor 610 which extracts the UPC codes from the buffer 608 and outputs the relevant UPC codes 608 to a comparator unit 612.

The comparator unit 612 is connected to a second database 614 which contains a fuel listing of the data listed on the program announcement 100, and the UPC codes for the discounts for each of the discount triggering items. This data corresponds to the discount triggering items for which discounts will be given, the minimum and maximum quantity of discount triggering items which may be purchased, and the discount credit to be applied for each purchased amount up to the purchased quantity, and not to exceed the maximum discount amount. The second database 614 need not be stored in the same database as the first database 606, or other databases listed herein, but may optionally be stored in a separate device from the first database 606. When a match is found between the data stored for a UPC code in the second database 614, it is output by the extractor 610 to the comparator 612, which outputs a store signal to the store register 616 to cause storage of the relevant data of the units purchased in a third database 618. Once the unit credit is stored in the third database 618, the data is transmitted back to the point-of-sale system 602, and output on a receipt printer 620. The output of the receipt printer 620 is the receipt 300 which comprises the redemption slip 212. The third database 618 is connected to a second portion of the fuel reward program system by a communications link 622. All discount credits granted, or coupons dispensed, either electronically or by printed ticket, are stored in the database 618 for later retrieval for tracking and auditing purposes.

Figure 7:
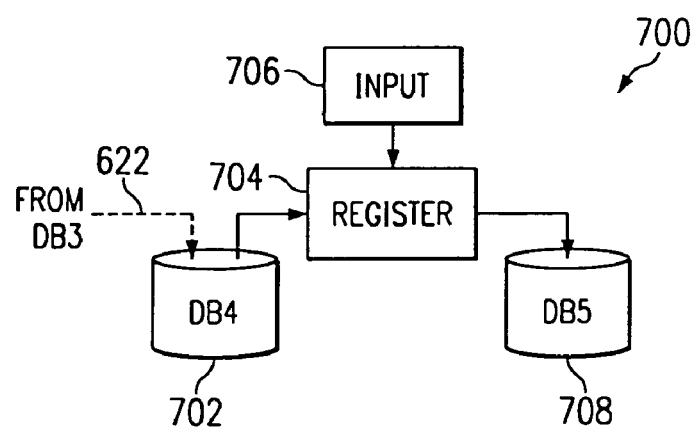
FIG. 7 illustrates a second portion of the data processing system for use at a second point of sale according to the present invention.

Referring now to FIG. 7, there is illustrated a second portion 700 of a data processing system 600 for use with the fuel reward program system of the present invention. The communication link 622 links up with a fourth database 702 which stores the accumulated units purchased and the information of the program announcement 100 set forth in the second database 614. A register 704 defines a point-of-sale system at which gasoline is purchased and loaded into a purchaser's gasoline tank at a pump. An input device 706 is utilized to input data relating to the identity of the purchaser who is purchasing the gasoline, or the accumulated amounts of the accumulated discounts to be applied to the purchased gasoline. The input device 706 may be a credit card type system providing an identifier of the purchaser, such as that provided by a bar code, an electronic card, a magnetic strip, or smart card technology. The identifier of the purchaser may also be provided by a code which is entered manually by the user, such as a four-digit code identifying a particular unit of accumulated credit discounts which should be applied to the gasoline purchase. The input device 706 is used to identify the accumulated discount credit which should be applied according to the data stored in the third database 618 of data processing system 600 of FIG. 4.

Alternatively, the communication link 622 and the fourth database 702 may be omitted and instead the total value of the redemption slip 212 may be entered by either the purchaser according to a matching verification code, or presented to the attendant at the site of the second point of sale when the gasoline is purchased. The attendant may also key the appropriate data into the input device 706. The register 704 then applies the credit discount and the credit discount information is stored in a fifth database 708. The fifth database 708 contains information relating to redeemed discounts which is sent to a clearinghouse for sorting between the various purchasers, which is also used for tracking and auditing. Alternatively, the transaction discount summaries of the redemption slips 212 may be utilized to charge various product suppliers and manufacturers with the amounts discounted and redeemed during the gasoline purchases, for payment of the redeemed discount amounts to the grocery store operators.

Figure 8:
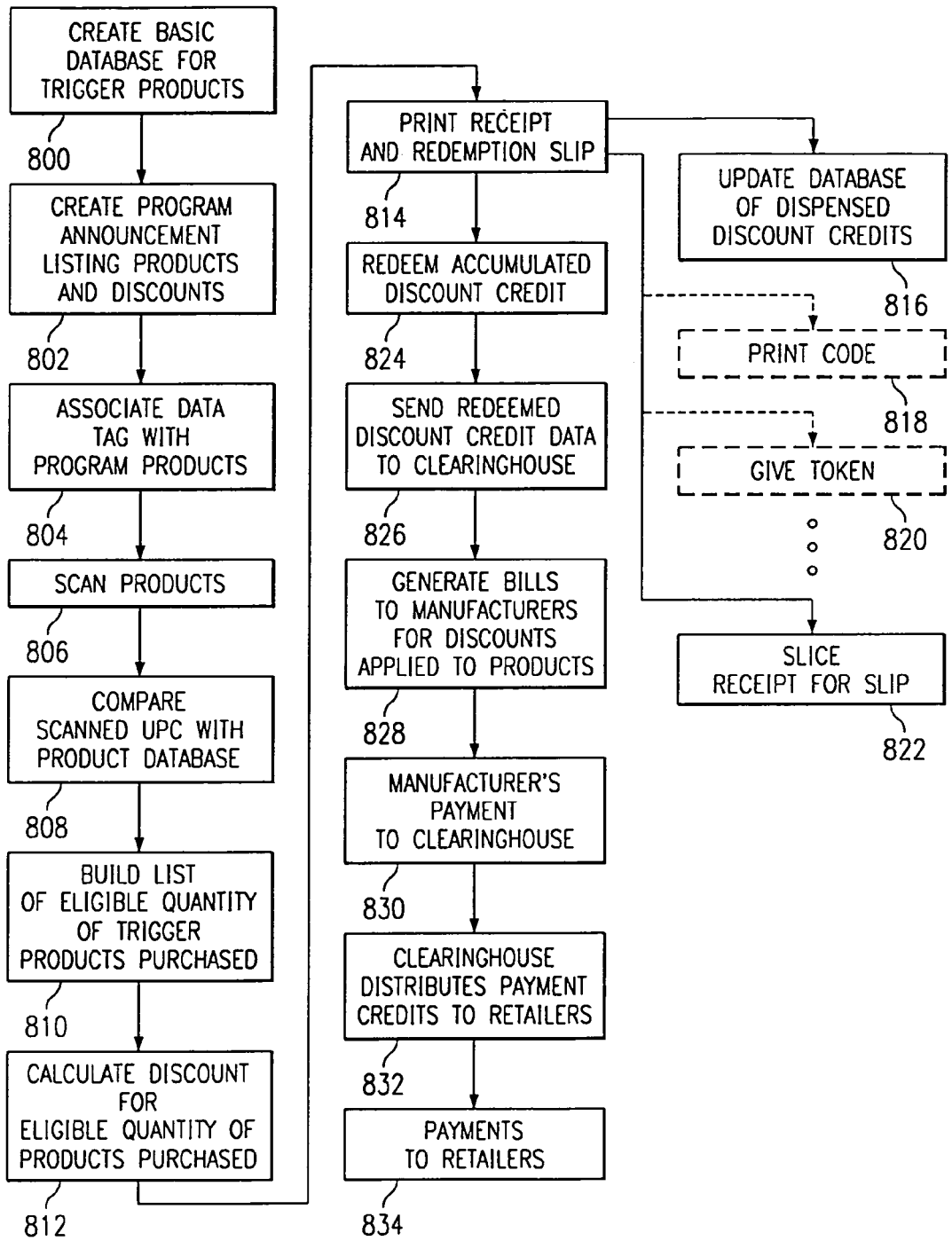
FIG. 8 illustrates a block diagram of a method of use of the present invention.

Referring now to FIG. 8, there is illustrated a block diagram depicting a method of operating the fuel reward program system of the present invention. In a block 800, there is depicted the step of creating a basic database listing for each of the various trigger products which are input into the program announcement 100 of FIG. 1 for promotion. A block 802 depicts the step of according a cost per gallon discount for each of the products listed in the basic database. In a block 804, a step is depicted of associating a data tag with each of the listed trigger products being promoted by the discounts according to a UPC code.

A block 806 depicts the step of scanning the various products at the first point of sale which occurs in the grocery store. A block 808 illustrates a step of comparing the UPC of the product scanned with that listed in the database created in the steps of blocks 800, 802 and 804. A block 810 illustrates a step of building a list of discount trigger items actually purchased and the quantity of the particular products promoted which do not exceed the maximum listed quantities for various ones of the products. A block 812 illustrates the step of calculating a discount according to the maximum quantities and the actual number of the promoted products being purchased at the first point of sale. A block 814 depicts the steps of printing a receipt voucher, such as the redemption slip 212. Block 816 indicates the step of updating the database according to the dispensed discount credits.

An alternative to printing a receipt voucher in the step depicted in the block 814, such as redemption slip 212, is the step depicted by a block 820 of printing a discount retrieval code. This retrieval code may be printed on a receipt similar to the upper portion 302 of the receipt 300 of FIG. 3, which is printed at the first point of sale, such as a four-digit code, for providing the fuel reward program system with input information to identify the total accumulated discount to be applied to the later gasoline purchase at the second point of sale. Additionally, a block 820 depicts an alternative embodiment of a token being given for the accumulated discount credit. A block 822 depicts the step of slicing the end of the receipt 300, and then printing the redemption slip 212 at the end of the receipt 300, as shown in FIG. 3.

A block 824 depicts the step of redeeming the accumulated discount credit by providing either a purchaser identifier or a purchase identifier at the input device 706, which may be accomplished by a bar code, an electronic card, a magnetic strip, smart card technology, an input code or such other system, or by turning the receipt into a gas attendant to receive the discount. The step of redeeming the accumulated discount may be automated by electronic data transfer once the purchaser is identified at the second point of sale at which gasoline is received. A block 826 depicts the step of sending to a clearinghouse transaction discount data relating to the applied accumulated total discounts from multiple sales over a period of time, and various corresponding products which where purchased to accumulate the discounts actually applied to the gasoline purchase. The clearinghouse will then sort the applied discount amounts according to the product suppliers and manufacturers who offered the discounts to promote particular products. A block 828 depicts the step of generating invoices for sending to various product suppliers and manufacturers. A block 830 depicts the step of the product suppliers and the manufacturers receiving the invoices and making payment to the clearinghouse. A block 832 depicts the step of the clearinghouse according the payments to the various retailers for reimbursement of the applied discounts granted to retail purchasers of the promoted products. A block 834 depicts payment by the clearinghouse to the various ones of the retail stores for reimbursement of the applied discounts.

Figure 9:
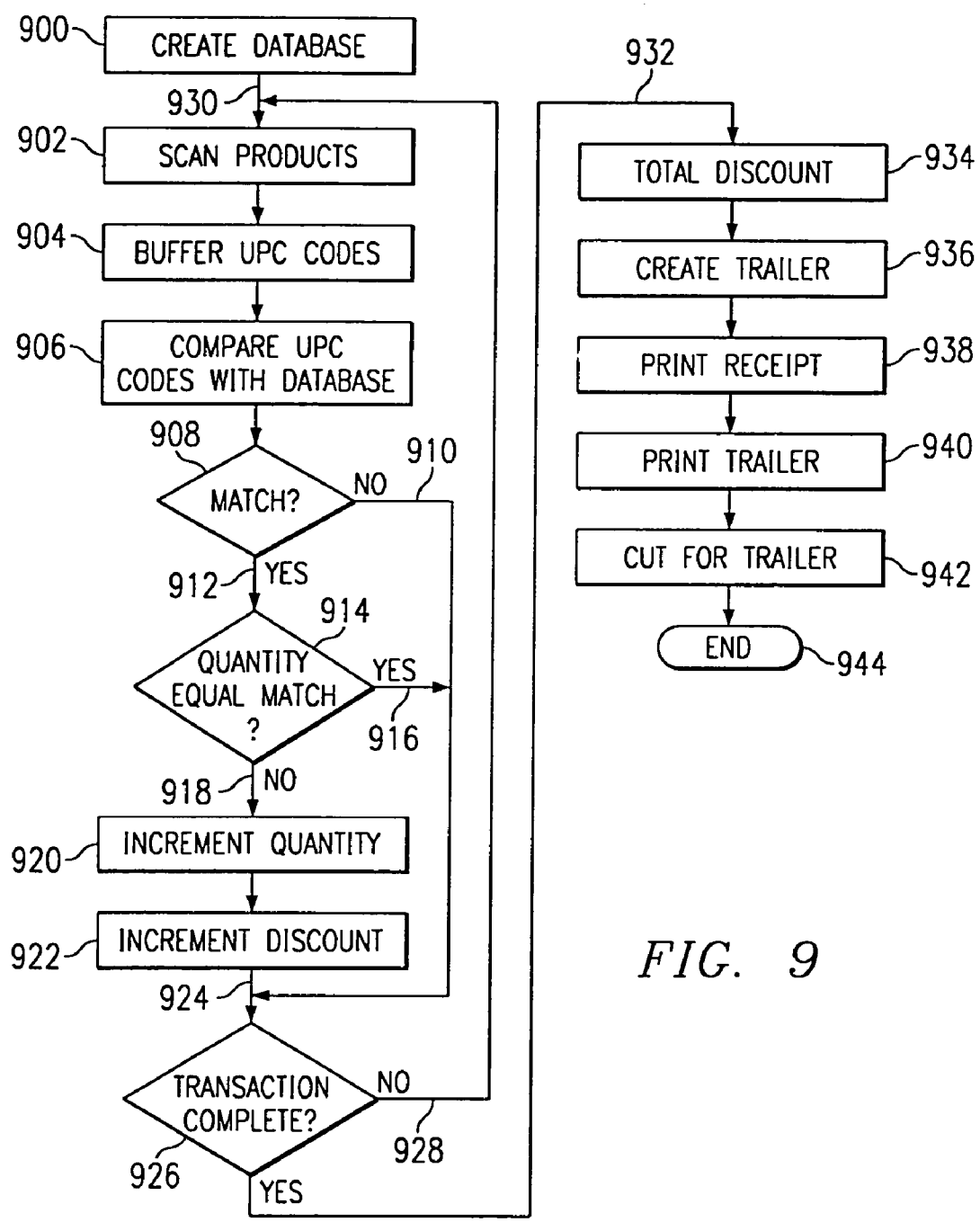
FIG. 9 illustrates a block diagram depicting operation of the data processing system according to the present invention.

Referring now to FIG. 9, there is illustrated block diagram which depicts a method of operation of the data processing system 600 of the fuel reward program system of the present invention. A block 900 depicts the step of creating a database. A block 902 depicts the step of scanning products at the first point of sale. A block 904 illustrates the step of buffering the various UPC codes for each of the purchased products. A block 906 depicts the step of comparing the UPC codes in the buffer of the step depicted in block 904 with the database created in the step depicted by the block 900. A block 908 illustrates a compare step in which the UPC codes of the products being promoted are compared to the UPC code of a product being purchased, and a "NO" signal is output to a node 910 if the codes do not match, or a "YES" signal is output on a node 912 if a match occurs. In the step depicted in a block 914, the quantity of a particular promoted product being purchased is compared to the maximum quantity of that product for application of the per product unit discount. In the compare step of the block 914, a "YES" results in an output to a node 916 and a "NO" results in an output to a node 918.

If the quantity comparison performed in the step depicted by the block 914 is not equal to maximum quantity of the particular promoted product under consideration, the path goes from the node 918 to the step depicted in a block 920 which is the step of incrementing the quantity of the various items purchased in the appropriate listing in the database. In a block 922, the step is depicted of incrementing the discount applied for one unit of the particular trigger products being scanned. Node 924 follows block 922, and depicts a point of convergence for the paths 910 and 916, which are respective outputs from the steps depicted by the blocks 908 and 914. If the entire purchase transaction is not complete, as detected by the step depicted in block 926, the programs flows to the node 928, which is connected to the node 930 for continuation of the scan product step depicted by the block 902. If the transaction is complete, then the path goes from block 926 through the node 932 to the step of totaling the discount depicted by a block 934. The program then flows to a block 936 which depicts the step of creating a trailer, such as the redemption slip 212 of FIGS. 4 and 5. A block 938 depicts the step of printing the upper portion 302 of the receipt 300. In a block 940, the step of printing the trailer (redemption slip 212) is depicted. A block 942 depicts the step of cutting the receipt 300 to separate the trailer (redemption slip 212) from the upper portion 302 of the receipt 300. A block 944 depicts the end of the above cycle for resetting the fuel reward program system for the next customer at the first point of sale.

In the embodiment described herein, the second product purchased, which is gasoline, is unrelated to the products purchased at the first point of sale which are being promoted by application of the discounts being accumulated. As used herein, products are unrelated when they are not offered by either the same manufacturers or suppliers, or by manufacturers or suppliers of competing product lines. Thus, grocery products and goods are unrelated to the free gasoline given to purchasers for fueling an automobile.

Referring now to FIG. 10, there is illustrated a block diagram of the POS 206 and the associated fuel rewards process. In general, the central POS is illustrated by a POS system 1002. This is a conventional POS that provides the core operating system for a store and it operates in a conventional manner. The POS is a conventional software application that is provided by a software manufacturer to the store. The fuel rewards program is basically an enhancement to this POS system and essentially constitutes a separate module. This module, when provided to the store, is accompanied by a software key. This software key allows the store owner to activate this feature and this software key is typically licensed from the rewards program provider. As such, the POS system 1002 illustrates the basic software which is operable to interface with a transaction database 1004 and, on an output thereof, with a printer 1006. The scanner 204 is operable to scan the item and then provide its output to some type comparator circuit 1008. An integral part of the POS 1002 is that identification is made of the UPC information. Comparator circuit 1008 is operable to compare the received UPC information from the scanner 204 with information in the transaction database 1004. As will be described hereinbelow, the transaction database 1004 constitutes a product information table which, for each UPC authorized by the store, will provide associated information for that UPC such as cost, description, etc. This is conventional information that is normally associated with a UPC. However, the transaction database 1004 is a modified transaction database with a modified product information table having contained therein information regarding discount information. This discount information is only associated with the UPCs participating in the rewards program, as will be described hereinbelow. The comparator 1008 is operable to determine when the received UPC corresponds to a UPC in the transaction database having discount information associated therewith representing that this item participates in the fuel rewards program. This information, in the form of the UPC, will then be stored in a potential buffer 1012, which contains some standard information as well as the discount information that was appended to the UPC information in the modified product information table. This information is contained within the potential buffer 1012 is in a sequential form. For example, if two items having the same UPC were purchased, they would basically occupy two rows in the potential buffer 1012 of an internal table associated therewith. The potential buffer 1012 merely keeps track of all of the information that is output by the comparator 1008.

There is provided a reward process 1014 that is running as an enhancement to the POS system 1002. This reward process 1014 interfaces with the potential buffer 1012 and the POS system 1002. As will be described hereinbelow, once the transaction is complete, the information in the potential buffer 1012 is processed by the reward process 1014 to create what is referred to as a "filtered potential buffer" 1016. This filtered potential buffer 1016 is basically a sorted and filtered representation of the potential buffer 1012. As such, a separate table, a redemption table, will be created and stored in the filtered potential buffer 1016 which will essentially represent each UPC that has a discount associated therewith and associated information therefor. All information for a particular UPC will be contained in one row of this table. This will be described in more detail hereinbelow. Once the filtered potential buffer 1016 is created, this will allow the creation of the redemption slip 212. In association with the redemption slip 212, there is also created what is referred to as "potential file" 1018. This potential file 1018, as will be described in more detail hereinbelow, represents basic information regarding the transaction and which is an accumulated file. This is accumulated over multiple transactions or receipts, a transaction being defined as a single receipt that is generated having an associated redemption slip 212. Whenever all the items that a purchaser has collected are scanned and entered into the system and the transaction is indicated as being complete, this will constitute a transaction. As will also be described hereinbelow, each transaction will have associated with it a unique identification number (UID). This will be an important aspect of the redemption slip 212 and the rewards program. The POS system 1002, when processing the information in the received UPCs, will store this information in what is referred to as a "purchase buffer" 1020. This purchase buffer 1020 basically stores all of the purchased items and the information associated therewith that will be printed onto the receipt 300. In the disclosed embodiment, all the information that is to be printed on the receipt 300 is buffered prior to printing such that all information is collected for the purpose of generating the redemption slip 212. Once all information has been collected and the reward process 1014 has determined the information to be printed onto the redemption slip 212, then the system will print the entire receipt 300. However, the system could also print the purchase information as it is received and scanned, a conventional method for such printing, and just merely provide an "on-the-fly" calculation of the filtered potential buffer 1016 and the redemption table contained therein.

Referring now to FIG. 11, there is illustrated a flowchart for depicting how the system is initially set up. Periodically, the fuel rewards provider must provide in some form information which indicates the items which are participating in the fuel rewards program, these being defined as the discount triggering items. Each of these triggering items are defined in the form of its UPC and the various fields that need to be appended to the conventional product information table for the store. The program is initiated at a start block 1102 and then proceeds to a decision block 1104.

The decision block 1104 determines whether the system has received a discount item table. The discount item table, as described above, is just a list of all UPC's participating in the program and the associated information for the program such as the UPC of the product, the manufacturer associated with the product, the actual number of cents that is to be discounted for the product, the quantity limit which can be a maximum or a minimum limit, and also information regarding omitted chains, which are optional flags to state that the item is to be omitted from certain grocery chain lists. With respect to the quantity limits, in the disclosed embodiment, the minimum quantity indicates a threshold wherein if the user purchases less than the minimum, they will not be provided any credit for discount on that product. The maximum quantity indicates the maximum number of a particular discount triggering item which can be purchased by an individual and still receive a discount. Periodically, this table will be sent to the grocery chains. This table will contain only the UPCs to be used until the next update.

Once the discount item table has been received, as indicated by the block 1104, the program will then flow to a function block 1106 to then update the product information table. This will then provide a modified product information table having a plurality of appended fields for each UPC defining the discount information and also defining that this particular UPC participates in the fuel rewards program. The program will then flow to a decision block 1108 to determine if the product information table update has been completed. If not, the program will flow along a "N" path back to the input of function block 1106. When complete, the program will flow along a "Y" path to an END block 1110.

Referring now to FIG. 12, there is illustrated a diagrammatic view of the discount item table which is generated by the fuel rewards provider. This has a plurality of columns associated therewith, one column for the UPC, one for the actual discounts that are to be provided, a minimum quantity value, and a maximum quantity value. In addition, there is an optional column for the store chain that participates in this system. It may be that certain stores do not participate in a given discount for some reason or the other. For example, there are situations from a regulatory standpoint, that certain states or regions do not allow discounts on some products.

Figures 13, 14:
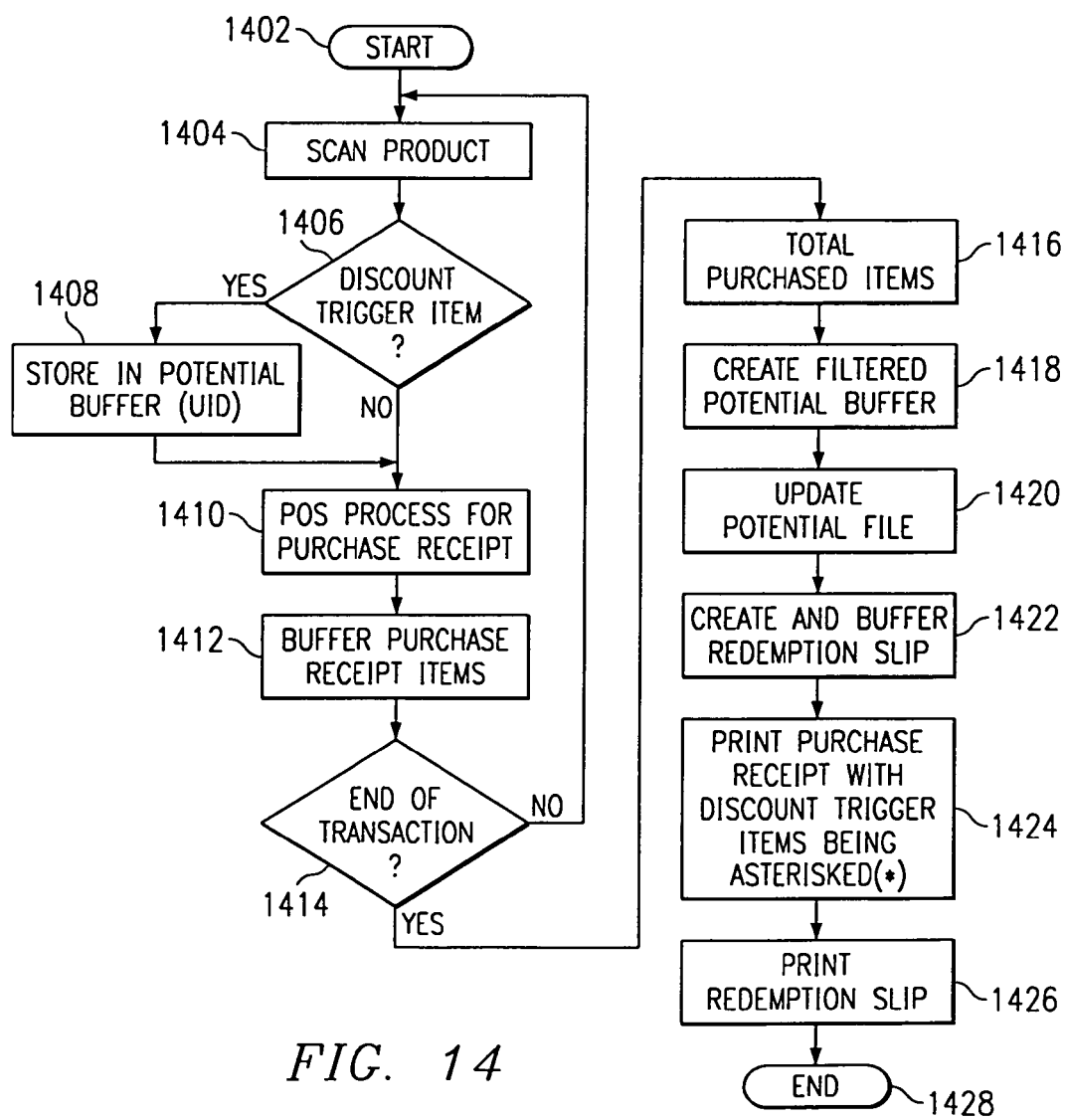
FIG. 13 illustrates a diagrammatic view of the store product information table.
FIG. 14 illustrates flowchart for the operation of creating the receipt illustrated in FIGS. 3a and 3b.

Referring now to FIG. 13, there is illustrated a diagrammatic view of the store product information table which provides a plurality of conventional fields labeled F1, F2, . . . , which define conventional information about a product, such as price for the product, description of the product, etc. In addition, there are provided additional fields in columns 1302 associated with the discount information from the discount item table. Basically, the generation of this store product information table of FIG. 13 is done through a merging operation between the conventional store product information table and the discount item table.

Referring now to FIG. 14, there is illustrated a flowchart depicting overall operation of the fuel rewards program necessary to generate the redemption slip 212. The program is initiated at a start block 1402 and then proceeds to a function 1404 to scan the product bar code, and then to a decision block 1406. The decision block 1406 determines whether the scanned product was a discount triggering item. If so, the program will flow along a "Y" path to a function block 1408 to store the necessary information in the potential buffer 1012. The only information that is stored in the potential buffer 1012 is that information necessary for generating the redemption slip 212. Therefore, the price and all other superfluous information that is not necessary for the redemption slip 212 will be discarded and only the necessary information will be placed in the potential buffer 1012. This information is, in general, the discount, the minimum quantity, the maximum quantity, the UPC code, and the UID. If the store chain does not participate in that particular item, it will also not be considered to be a discount triggering item.

In addition to the information stored in the potential buffer 1012 at the initiation of a transaction, that transaction will have associated therewith a UID. Consequently, each subsequent line item of that particular transaction also has associated with it a UID.

After storage in the potential buffer 1012 as indicated in block 1408, the program will flow to a function block 1410, which will also be the direction of the path if there was no discount triggering item found in decision block 1406, such that the path from decision block 1406 is along a "N" path to function block 1410. Function 1410 is operable to process at the POS 1002. This basically generates the information for the purchase receipt 300, which is conventional. The program then flows to a function block 1412 to buffer this purchase receipt information in the purchase buffer 1020. However, as described hereinabove, this could also be a print operation where a subtotal is always generated and the purchase information is printed for each item. The program will then flow to a decision block 1414 to determine if the transaction has been completed. If not, the program will flow along a "N" path back to the input of the function block 1404. When the end of transaction has been completed due to the cashier hitting the "end-of-transaction button," the program will then flow along the "Y" path to a function block 1416.

Function block 1416 basically totals the purchased items by outputting the contents of the purchase buffer 1020, and then the program flows to a function block 1418 to create the filtered potential buffer. The redemption table, as described hereinabove, is basically a sorted information in the potential buffer 1012 in function block 1408. All the information must be accrued in potential buffer 1012 in function block 1408 before it can be compared at the end of the transaction with the minimum and maximum quantity limitations. At this time, information that does not meet the criteria for inclusion within the redemption slip 212 due to such things as being less than the minimum quantity or over the maximum quantity, will be discarded and will not be contained within the redemption table. Therefore, the redemption table will be a filtered version of the information contained in the potential buffer 1012. After the redemption table is created, the program will flow to a function block 1420 to update the potential file. This potential file 1018, as described briefly hereinabove, is a file that includes information regarding each UPC for each UID or each transaction. It will store the total amount of the discount on a transaction basis that was provided for each UPC for the associated UID. Therefore, if there were multiple transactions during the day for different discount triggering items, then there would be multiple UIDs, and for each UID there would be UPC's associated with a particular product. This will be described in more detail hereinbelow.

After updating of the potential file 1018 for the new transaction, the program will then flow to a function block 1422 to create and buffer a redemption slip 212, and then to a function block 1424 to print the upper portion 302 of purchase receipt 300 with the discount trigger items being associated with, for example, an asterisk (*). This will be followed by the redemption slip 212 as a "trailer" slip as indicated by function block 1426. The program will then flow to an END block 1428.

Figures 15, 16, 17, 18:
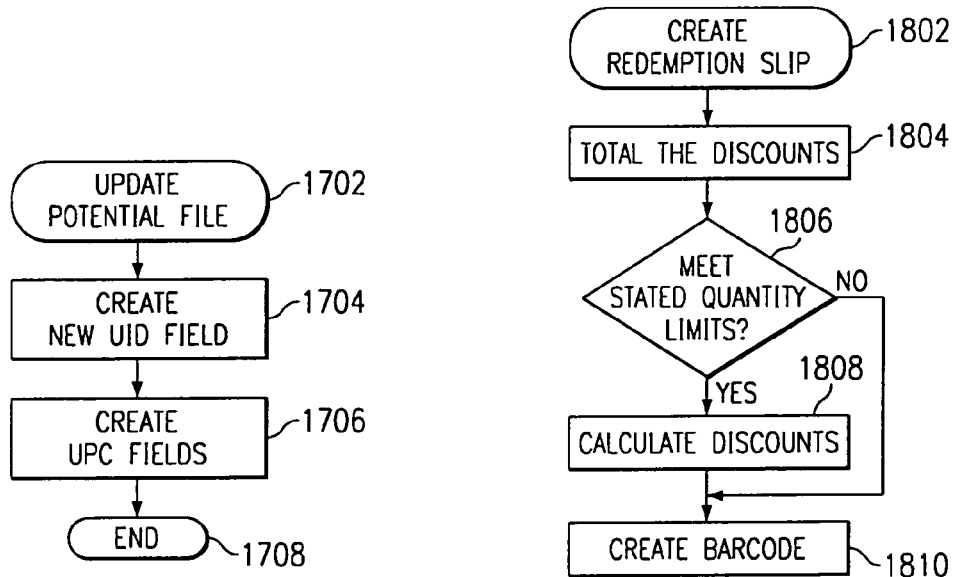
FIG. 15 illustrates a diagrammatic view of the redemption table.
FIG. 16 illustrates a diagrammatic view of the potential file.
FIG. 17 illustrates a flowchart for updating the potential file.
FIG. 18 illustrates a flowchart for creating the redemption slip.

Referring now to FIG. 15, there is illustrated a diagrammatic view of the redemption table. The redemption table has associated therewith, as disclosed hereinabove, a UID. The redemption table will contain the information necessary to create the redemption slip 212. The table will have each UPC that had transactions associated therewith in the potential buffer 1012. For example, if there were five items purchased with a common or identical UPC, then there would be provided one row for this UPC and the UPC number would be disposed in the first column. The second column would be a quantity associated with that UPC, followed by the description and then the total discount. Therefore, the redemption table would be created whilst totaling all of the discounts such that a total discount would be provided. Also, a UID is associated with each line in the redemption table. It should also be understood that any information that needs to be printed on the redemption slip 212, which must be calculated from that contained within the potential buffer 1012, could be included in this redemption table. This redemption table is merely a way to filter out the information from the store product information table.

Referring now to FIG. 16, there is illustrated a diagrammatic view of the potential file 1018. The potential file 1018, as described hereinabove, is a file that is generated at the end of a transaction. The purpose of the potential file 1018 is to maintain within the POS information regarding each transaction and the total discounts for each UPC in that transaction. As also noted hereinabove, each transaction is defined by a UID. Therefore, the information contained in the potential file 1018 consists of a UPC column, a UID column, and a total discount for each UPC column. In addition, there is provided a "redeemed" column which will be described hereinbelow.

In the example illustrated in FIG. 16, there are provided two UIDs, UID "XXX" and UID "YYY." For each of the transactions associated with the UID XXX and the UID YYY, there are provided thereunder purchases associated with discount triggering items "A" and "B." For the UID XXX, the total discount for UPC "A" was $4.50, and the total discount for UPC "B" in UID XXX was $0.48. This represents the total discount that was provided for all purchases under those particular UPCs. It is not important in the potential file 1018 to keep an account of the number of items sold for a given UPC; rather, it is only important that the total discount is maintained. In the "redeemed" column, there will be a flag set, which is typically the "flipping" of a bit from "0" to "1" in order to show that the redemption slip 212 was redeemed at the store within the appropriate time window.

The information in the potential file 1018 can be utilized at a later time for transfer to the clearinghouse to provide a total of all transactions not previously sent to the clearinghouse that have been redeemed by a store. Of course, there are safeguards placed in the system to provide a confidence level to the clearinghouse that the numbers transferred thereto in fact represent proper transactions. By keeping the potential file 1018, it is possible to provide an electronic record of all of the redemption slips 212. This is to be compared with conventional systems that require the clearinghouse to process slips of paper. In addition, by segregating the information by transactions in the form of UIDs it is possible to check these records against the actual redemption slips 212 themselves, either completely or on a spot-type check basis.

Referring now to FIG. 17, there is illustrated a flowchart depicting the operation of updating the potential file 1018. This is initiated at a block 1702 and then the program flows to a function block 1704 wherein a new UID field is created with the UID number for the transaction disposed therein. The program then flows to a function clock 1706 to create new UPC fields for each UPC associated with a transaction for the particular UID. Once all UPCs have been created and the information stored therein, the program then flows to an End block 1708.

Referring now to FIG. 18, there is illustrated a flowchart depicting the operation for creating the actual redemption slip 212. The program is initiated at a block 1802 and then flows to a function block 1804 to total the discounts, the discounts being set forth in the redemption table. As described hereinabove, the redemption table maintains a running total for each of the UPCs. This will essentially provide a total discount for the transaction. The program then flows to decision block 1806 to determine if the total discount determined in block 1804 meets the stated quantity limitations. If so, the program will flow to a function block 1808 wherein discounts are calculated. The item summarizations then go through a predetermined filter algorithm. For example, it may be that one item is removed from each UPC in a transaction until the total discount is less than the maximum allowable. This would then require readjusting the total discount and then adjusting the contents of the potential file 1018. Once either the discounts are calculated or it is determined that the total discounts do not exceed the maximum allowable discount, the program will flow to a function block 1810 to create the bar code. This essentially constitutes all of the information in the redemption slip 212, which is then buffered. The program flows to a block 1811 to print the redemption slip 212. The program then flows to an End block 1812.

Figure 19:
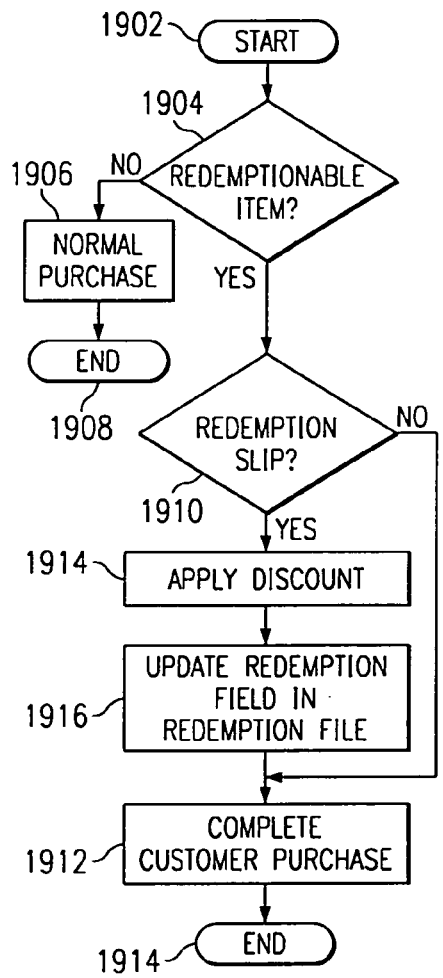
FIG. 19 illustrates a flowchart for the redemption operation for dispensing fuel and applying the discount provided by the redemption slip.

Referring now to FIG. 19, there is illustrated a flowchart depicting the operation of redeeming the redemption slip 212. The program is initiated at a function block 1902 and then proceeds to a decision block 1904. The decision block 1904 determines whether the desired item by the customer is a redemptionable item. If not, the program will flow along an "N" path to function block 1906. The function block 1906 defines this as a normal purchase and processes it according to standard procedures. The program then flows to an End block 1908. However, if it has been determined that this is a discount triggering item, then the program will flow to a decision block 1910 to determine if a redemption slip 212 has been provided. If not, the program will flow to a function block 1912 to complete the purchase operation for the discount item, and then to an End block 1914. However, if a redemption slip 212 has been provided, the program will flow from decision block 1910 along the "Y" path to a function block 1914. Function block 1914 indicates the operation wherein the discount is applied. The program then flows to a function block 1916 wherein the redemption field, labeled "redeemed" in the redemption file, is updated. The redemption file contains only the UID, and the time and date stamp. The program will then flow to function block 1912 and then to the End block 1914.

The operation of processing the redemption slip 212 allows a discount to be provided to a customer as a result of purchasing discount triggering items, in accordance with the fuel rewards program, described in the disclosed embodiment herein. However, it is still necessary for the store owner to retrieve payment from the clearinghouse, which then processes the information to transfer funds to the store owner and debit accounts from the manufacturers of the discount triggering items. In one embodiment, this is facilitated by the use of a redemption slip 212 which provides "bundled" sums for each discount triggering item. This is distinctly different from previous systems wherein each coupon with its discount was required to be scanned into the system and then provided to the clearinghouse. Further, the use of an electronic transaction also facilitates the clearinghouse operation in that once a confidence level is established in the electronic transaction system, the potential file 1018 itself can be relied upon by the clearinghouse to send "bundled" sums to the vendor offering the discount triggering item.

Figure 20:
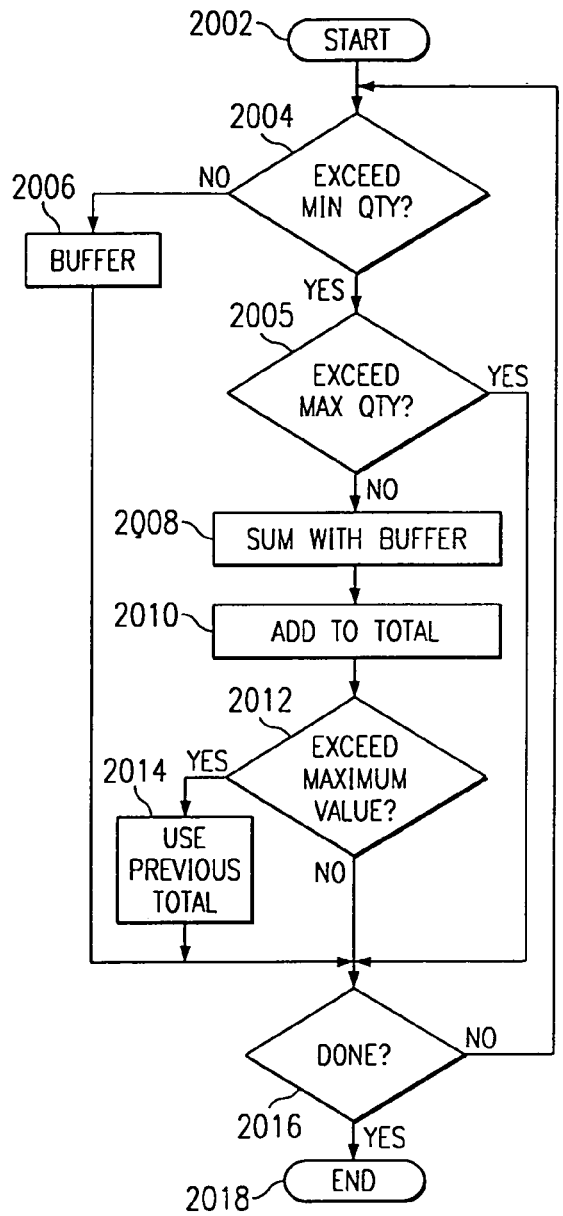
FIG. 20 illustrates a flowchart depicting a method for generating an award total when the award total exceeds a maximum value.

Referring now to FIG. 20, there is illustrated a flowchart depicting the operation wherein a maximum award value is defined. In general, the information provided to the store in the form of the discount item table (FIG. 12) constitutes the UPC code for participating products, the unit award amount (cents off/gallon in the disclosed embodiment), and the quantity limits per receipt. In addition, the store provides certain information. The store will provide a unit award multiplier, which constitutes the amount of the redemptionable item (e.g., gasoline) to which the discount associated with the discount triggering item applies. For example, in the disclosed embodiment, the redemptionable item is gasoline. The manufacturer provides a discount in terms of cents off/gallon. If the unit award multiplier were twelve (12) gallons, this would be multiplied by the cents off/gallon in order to determine the total award for each discount triggering item. If, for example, the discount was $0.02 per gallon and there were twelve (12) gallons, this would result in a total discount of $0.24 per item purchased. In addition, the store owner could insert a practical gas price which would represent the average gas price over a period of time such that, for the life of the redemption slip 212, the store owner would have to anticipate the price of gasoline. Therefore, the UPC's contribution to the total award would be (unit award amount)*(quantity purchased)*(unit award multiplier). Of course, this contribution will always be subject to the minimum quantity and the maximum quantity limits per receipt, if they exist. At the end of the transaction, the redemption table is built within these limits by processing through the initial set of scanned values and processing the information in accordance with the limits.

Referring again to FIG. 20, the program is initiated at a block 2002. This is the block at which the information stored in the redemption file is processed in order to determine the maximum award value for a given redemption slip 212. Each UPC is processed in a decision block 2004 to determine if the quantity scanned has exceeded the minimum quantity. If it is the first discount triggering item purchased and the minimum is two, then this has not exceeded the minimum and the program will flow along a "N" path to a function block 2006 to buffer the quantity value for that UPC. If it has exceeded the minimum, then the program will flow to a decision block 2005 to determine if a maximum quantity has been exceeded. If the maximum has been exceeded, the program will flow along a "Y" path to a decision block 2016 to determine if more processing is to be performed, i.e., there are more UPCs stored in the UPC table. If the maximum has not been exceeded, the program flows from the "N" path of decision block 2005 to a function block 2008. The function block 2008 is operable to sum the value with the previous value in the buffer. In general, the buffer in the function block 2006 keeps information regarding each UPC and the quantity thereof. Therefore, the function block 2008 merely sums the new value with the previous value in the buffer and then flows to a function block 2010 to add the contents of the buffer for that UPC with the total award value, which is contained in a separate register or buffer. The program will then flow to a decision block 2012 to determine if the total value has exceeded the maximum value that is set by the store. If so, the program will flow along the "Y" path to a function block 2014 to utilize the previous total. If not, the program will flow along a "N" path to utilize the new total and then to a decision block 2016 to determine if more processing is to be performed, i.e., there are more UPCs stored in the UPC table. If not, the program will flow along the "N" path back to the input of decision block 2004. Both the output of function block 2006 and the output of function block 2012 will also flow to the input of decision block 2016. When complete, the program will flow along the "Y" path to the End block 2018.

Referring now to FIG. 21, there is illustrated a redemption slip 212 without the bar code, it being understood that a bar code could be included on this redemption slip 212 but is not set forth for simplicity purposes. It can be seen that there are twelve (12) items, each having an award amount associated therewith, the item set forth in terms of their UPC code, their description, and also the quantity. There is provided a maximum value of $9.60 for this receipt.

In the situation where the user takes the redemption slip 212 to the redemption location, there is provided the ability to treat as redeemed the entire award value and then provide to the customer a credit slip 2200. This credit slip 2200 is illustrated in FIG. 22, wherein the original purchase award value of $9.60 exceeded a gas purchase price of $6.00, resulting in a credit of $3.60. This redemption slip 212 has an expiration date associated therewith.

Figure 23:
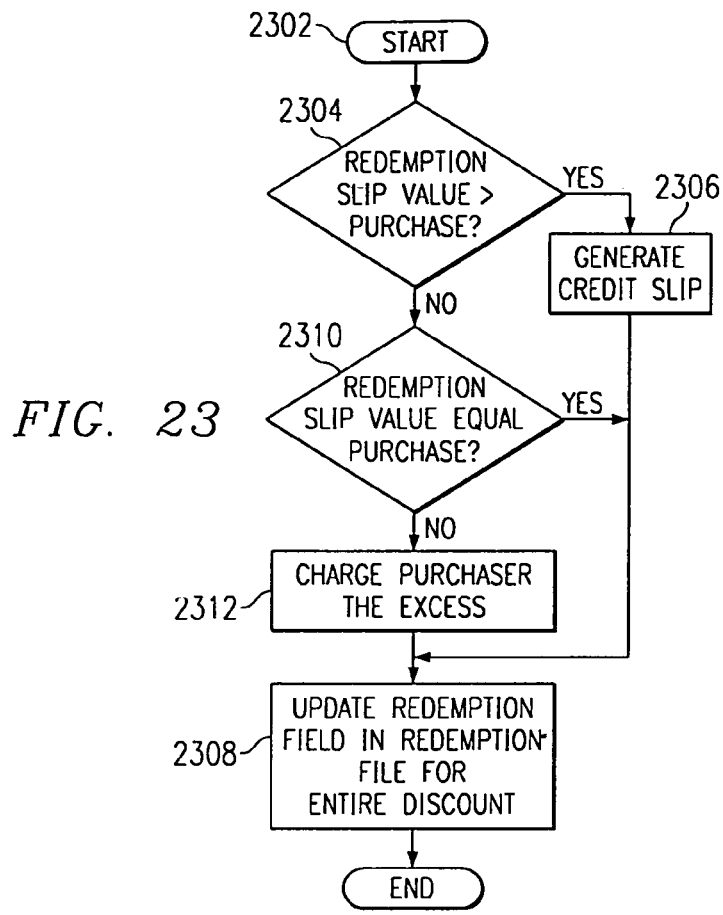
FIG. 23 illustrates a flowchart for an alternate embodiment of redeeming the redemption slips.

Referring now to FIG. 23, there is illustrated a flowchart depicting the operation of processing the redemption slip 212 and generating a credit slip 2200. The program is initiated at a start block 2302, and then proceeds to a decision block 2304 to determine if the value of the credit slip 2200 and the total award value therein is greater than the purchase price of the gasoline. It should be understood that the store owner has the ability to place a maximum value on the system such that this cannot happen and, therefore, it will not redeem the entire credit. However, in the disclosed embodiment, when a credit slip 2200 is presented for gasoline, the entire value of the credit slip 2200 will be applied. Additionally, there can be a limit on the minimum number of gallons that must be purchased in order to use the redemption slip 212. If the value of the redemption slip 212 is greater than the purchase, the program will flow along the "Y" path to a function block 2306 wherein a credit clip; 2200 will be generated, that illustrated in FIG. 22 hereinabove. This credit slip 2200 reflects the difference, and the program will flow along a path to a function block 2308 to update the redemption field, which will be described hereinbelow.

If the value of the redemption slip 212 is not greater than the purchase, the program will flow along a "N" path to a decision block 2310 to determine if the value of the credit slip 2200 is equal to the purchase. If so, the program will flow along a "Y" path to the function block 2308. If the purchase price is not determined to be equal to the value of the redemption slip 212, the program will flow from the decision block 2310 to a function block 2312 in order to charge the purchaser for the excess over that of the redemption slip 212. The program will then flow from function block 2312 to the function block 2308. The function block 2308 is the update operation. It should be noted that the entire value of the redemption slip 212 is applied to the redemption field in the redemption file for the entire discount. Therefore, if the award value on the redemption slip 212 were $9.60 and the gas purchase were $6.00, then a credit of $3.60 would be provided to the user. However, it is important to note that the store owner will receive $9.60 from the manufacturer as a credit for the sale of their discount triggering items. This has an advantage in that, if the customer loses their credit slip 2200 or decides not to use it within the expiration period, then the store has actually made money on the transaction since it has not had to redeem the redemption slip 212.

Figure 24:
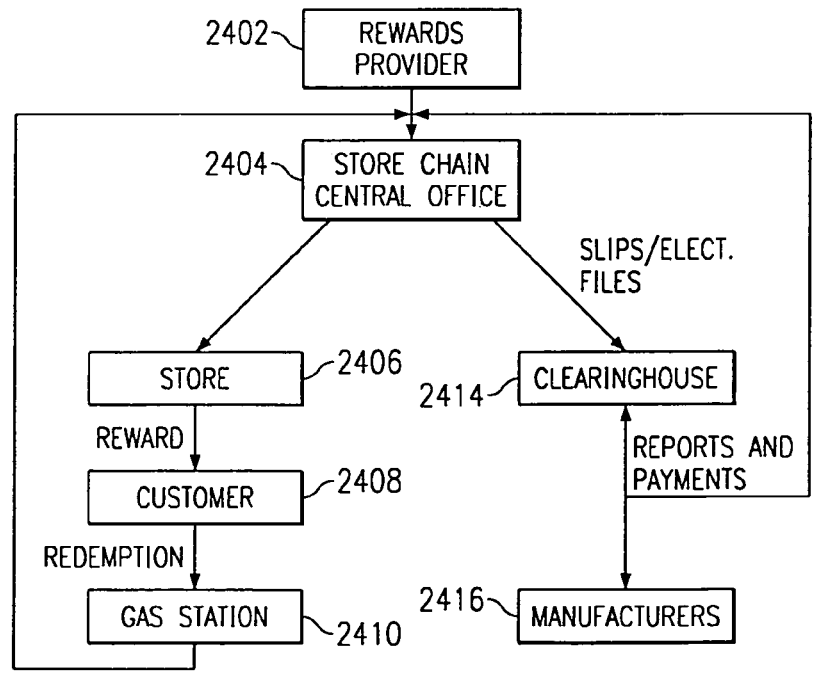
FIG. 24 illustrates a top level diagrammatic view of the overall operation of providing the fuel reward program and processing it through the clearinghouse.

Referring now to FIG. 24, there is illustrated an overall diagrammatic view of the process for providing the rewards program from inputting information to the store to processing of the redemption slips 212 after redemption thereof with the clearinghouse and the manufacturers. This figure simply illustrates the functional relationships between the various entities of the fuel rewards program. The rewards provider is indicated by a block 2402, which rewards provider interfaces with manufacturers and the clearinghouse, and provides the various UPCs and associated information for discount triggering items. The rewards provider 2402 interfaces with stores to provide all aspects of the rewards program, including the brochures and announcements, etc., that will be displayed in the store, and also interfacing with the stores to ensure that operating systems have been updated with fuel rewards enhancements.

Once all of the information for a particular fuel rewards program for a particular store is assembled, the rewards provider 2402 will forward that to the central office of a particular store chain, as indicated by a block 2404. The central office will then transmit the appropriate information to a select one or more of the stores, each represented by a block 2406, there only being one represented for simplicity purposes. The store 2406, as described hereinabove, will process items, determine if they are discount triggering items, and then provide a reward to a customer, indicated by a block 2408. This reward, as described hereinabove, is the redemption slip 212. The customer will then redeem this redemption slip 212 at, for example, a gas station as indicated by a block 2410. This redemption is the triggering process that creates a liability from a manufacturer to the store. The information that is collected at the gas station 2410 is in the form of redemption slips 212, and the electronic files. However, it should be understood that the gas station 2410 and the store 2406 are not typically on the same POS but can, if possible, transfer information to the central office 2404 from the POS. Once the central office has the redemption slips 212 and the electronic files, i.e., the information, it will then transmit this to a clearinghouse, as indicated by a block 2412. The clearinghouse 2412 will receive both the electronic files and the redemption slips 212 and will process those, as will be described hereinbelow. Once processed, it will then transfer this information to the manufacturers, represented by block 2416, which represents all of the manufacturers associated with the information forwarded there to the clearinghouse 2412 by the central office 2404. In addition, both reports reflecting what was transmitted to the manufacturer 2416 and possibly a credit, will be forwarded to the central office 2404. This credit can either be directly transmitted to the central office 2404 from the clearinghouse 2412, or the manufacturer 2416 will be debited at a later time by the central office 2404. As described hereinabove, the use of bundling allows the clearinghouse to process considerably less information in order to generate a credit. The manufacturer is interested primarily in how many discount triggering items are sold. Therefore, by collecting this information as a total sum and then transferring this back to the clearinghouse 2412, and then to the manufacturer 2416, this considerably simplifies the overall rewards program.

Figure 25:
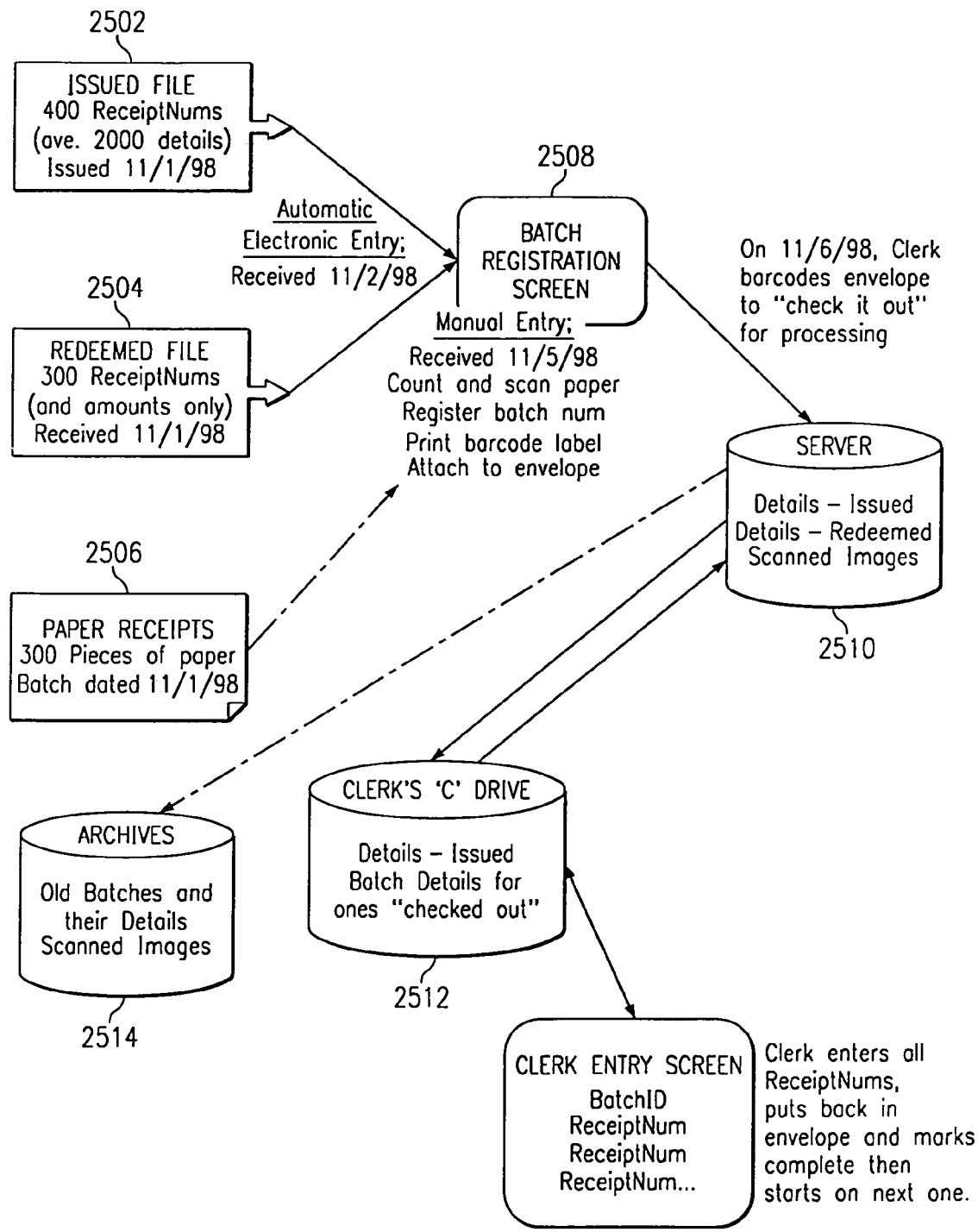
FIG. 25 illustrates a flowchart for processing information through the clearinghouse.

Referring now to FIG. 25, there is illustrated a diagrammatic view and flowchart for the operation of processing information at the clearinghouse. The central office 2404 will provide information in two manners. First, it will generate an issued file 2502, which issued file 2502 basically constitutes the contents of the potential file for both redeemed and un-redeemed redemption slips 212. It will also generate a redeemed file 2504 which will represent only those redemption slips 212 that have been redeemed. In the disclosed embodiment illustrated in FIG. 25, the issued file 2502 represents a total of 400 receipts and their associated UID that was issued on a particular date (e.g., Nov. 1, 1998). In the redeemed file 2504, there is illustrated only 300 redeemed receipts and their associated UID as having been received on the same date. Of course, these could have redemption slips 212 that were generated on a different day. The purpose of the date is to indicate that this "batching" operation is done on a daily basis. In addition, a block 2506 illustrates that paper receipts are also forwarded to the central office 2404 represented by a batching block 2508 and a batch registration screen. The paper receipts 2506 illustrate 300 pieces of paper, one for each redemption item in the redeemed file 2504. All of these batches are dated on the same day.

The issued file 2502 and the redeemed file 2504 are electronically entered on a common day, whereas the paper receipts 2506 are entered manually. This requires counting the number of paper receipts 2506 and storing the contents each paper in the server, by scanning the bar code label. Thereafter, a summary bar code is generated in a label and then attached to an envelope, which envelope contains the paper receipts 2506. This is used for tracking and accounting purposes, and represents the batch number of that particular manual entry operation. This generation of the bar code label is done by an employee who basically performs the checking operation. This information is stored in a server 2510 in the form of the scanned images of the paper receipts 2506, and the electronic information associated with the issued file 2502 and redeemed file 2504 batches. This information is interfaced with a clerical individual who enters all paper receipt numbers into a temporary storage area 2512, inserts the paper receipts 2506 back into in the bar-coded envelope, marks the envelope "completed" or "checked out" within the clerk's storage area, and then goes on to the next one. This information is temporarily maintained in the drive or storage area 2512, then transferred back to the server 2510. Once processed or expired, the information can then be forwarded to an archive area 2514.

The clearinghouse accounting and reporting operation is based upon the matching of the batched redemption slips 212, wherein the clerk has entered the receipts in the form of their UID and creates a Matched Rewards Details (MRD) table, which contains the resulting records, which are derived from the electronic originals. It is this matching of the electronic information in the form of the UID and totals that provides the confidence level to the clearinghouse. Throughout a given day, these details are grouped by vendor, totaled, and moved to accounting for appropriate collection and resolution. There are provided various electronic data links with automatic banking programs, such as those offered by most major banks to provide for collection and distribution processes. Daily reports are available to the internal management of the clearinghouse and also to the reward provider which summarize waiting, currently in progress, or completed transactions. There will also be provided a daily detailed vendor and grocery chain report that is transmitted via secure communication technology to appropriate clients and parties. Also, there are provided quarterly and yearly reports to all interested parties to show the trends and the accomplishments.

The tables that are provided in the batching process are associated with the schedule details of the promotional items, i.e., the discount triggering items, the table for the incoming award issue details, the table for incoming rewards redeemed received numbers, and also the matched rewards detail table. In addition, there will provided a batch control table. These tables are as follows:

TABLE 1.1

Promotion Items Schedule Details

| Field Name | Data Type | Description |
|---|---|---|
| UPC | Number | Universal Product Code |
| VendorCode | Text | Vendor that makes this product |
| StartDate | Date/Time | Date when this product is scheduled to start promotion |
| EndDate | Date/Time | Date when this product should be removed from the promotion list. |
| CentsOff | Number | Cents off for each unit purchase of this product (subject to limit specified) |
| QtyLimit | Number | Quantity limit for this item for each customer visit (0 means no limit) |
| OmittedChains | Memo | Optional - Omit item from charts whose id in this field (entered left to right with comma separator) |

TABLE 1.2

Incoming Rewards Issued Details

| Field Name | Data Type | Description |
|---|---|---|
| BatchID | Text | Calculation of chain, store, date, type (points to Batch Control table) |
| ReceiptID | Text | Chain's unique identifier printed on the original summary report |

TABLE 1.2-continued

Incoming Rewards Issued Details

| Field Name | Data Type | Description |
|---|---|---|
| UPC | Number | Universal Product Code for the reward item |
| LineItemTotAmtOff | Number | Total calculated amount off for this line item (qty * cents off) |
| MatchingBatchID | Text | Cross-reference of matching BatchID when this item is matched with a redeemed paper receipt number |

TABLE 1.3

Incoming Rewards Redeemed Receipt Numbers

| Field Name | Data Type | Description |
|---|---|---|
| BatchID | Text | Concatenation of chain, store, date, type (points to Batch Control table) |
| ReceiptID | Text | Chain's unique identifier printed on the original summary report |
| TotAmtOff | Number | Total calculated amount off for this line item (qty * cents off) |
| MatchinOriginalBatchID | Text | Cross-reference of matching BatchID when this item is matched with an original Issue receipt number |
| MatchingPaperBatchID | Text | Cross-reference of matching BatchID when this item is matched with a paper receipt number |

TABLE 1.4

Matched Rewards Details

| Field Name | Data Type | Description |
|---|---|---|
| UPC | Text | Concatenation of chain, store, date, type (points to Batch Control table) |
| ReceiptID | Text | Chain's unique identifier printed on the original summary report |
| TotAmtOff | Number | Total calculated amount off for this line item (qty * cents off) |
| RefNum | AutoNumber | Unique item reference number used to identify this individual item in the accounting journals |
| PostedTo | Text | Name of account where this item was posted (null until the item is posted) |
| PostedToDateTime | Date/Time | Date and time this item was posted to the proper accounting journal |

TABLE 1.5

Batch Controls

| Field Name | Data Type | Description |
|---|---|---|
| BatchIDChainCode | Text | Contains chainID |
| BatchIDStoreCode | Text | Individual store code |
| BatchIDDate | Date/Time | Date for this batch |
| BatchIDType | Text | Type of batch (ISSUED, REDEEMED, RECEIPTS) |
| BatchItemCnt | Number | Number of individual line items in this batch |
| BatchAggregateAmt | Number | Total aggregate dollar amount represented by this batch |
| Status | Text | Current Batch status (Registered, Assigned, Withdrawn, Processed, Journaled, Archived) |
| StatusDate | Date/Time | Date and time the current status was set |
| OwnerID | Text | ID of person or station having current assignment of the batch |
| StatusHistoryLog | Memo | History log of status changes (left to right series separated by commas: {status} {date} {ownerID} |
| IncomingFile | Text | Path and name of downloaded electronic file or paper scanned file |
| ArchiveURL | Text | URL path and names if this batch has been moved to the archives |

The present invention provides several advantages over prior art systems for applying purchase discounts for promoted products. The present invention allows for gasoline credits to be given such that the purchaser will receive free gasoline according to purchase discount credits for purchases of promoted products. The promoted products are purchased at, for example, a grocery store at a first point of sale, which is different than the second point of sale at which the gasoline is later purchased. The promoted products and the gasoline are purchased at points of sale which are separated in both time and distance, including points of sale for grocery stores which also have gasoline pumping facilities. Further, the total applied discount is accumulated, such that discounts for various promotional products are bundled into one total accumulated transaction discount which is applied at the second point of sale. Multiple discounts may be given for various promotional products. Discounts may be applied electronically and stored for redemption at a later time. Such bundled discount data may be processed at a clearinghouse for charging the redeemed amounts to the corresponding product suppliers and manufacturers for later payment to the retailers operating the various points of sale.

Although the preferred embodiment has been described in detail, it should be understood that various changes, substitutions and alterations can be made therein without departing from the spirit and scope of the invention as defined by the appended claims.

What is claimed is:

1. A computer-implemented method of providing a discount-per-gallon for fuel to a customer who purchases a threshold amount of goods or services, said method comprising:

awarding by a store computer a first discount-per-gallon for the fuel to the customer in response to a purchase by the customer of at least a first threshold amount of goods or services;

storing the first discount-per-gallon in a discount database;

awarding by the store computer a second discount-per-gallon for the fuel to the customer in response to a purchase by the customer of at least a second threshold amount of goods or services;

adding by the store computer the second discount-per-gallon to the first discount-per-gallon stored in the discount database to determine a total discount-per-gallon for the fuel;

receiving by a fueling station controller, an indication that the customer has initiated a subsequent purchase of fuel, said indication including an identifier associated with the total discount-per-gallon stored in the discount database;

retrieving by the fueling station controller in response to the indication that the customer has initiated a subsequent purchase of fuel, the total discount-per-gallon from the discount database;

dispensing a number of units of fuel to the customer at a posted price-per-gallon to determine a preliminary cost of the fuel;

calculating by a fuel controller a financial discount by multiplying the total discount-per-gallon by the number of units of fuel dispensed; and reducing by the fuel controller the preliminary cost by the calculated financial discount to determine a final cost of the fuel.

2. The method of claim 1, wherein the steps of awarding the first and second discounts-per-gallon for the fuel include the steps of:

calculating a cumulative total of purchases by the customer over a period of time;

awarding the first discount-per-gallon when the cumulative total of purchases is at least the first threshold amount; and awarding the second discount-per-gallon when the cumulative total of purchases is at least the second threshold amount.

3. The method of claim 1, wherein the goods and services are goods or services of a specified type.

4. The method of claim 1, wherein the steps of awarding, storing, and adding the discounts-per-gallon are performed by a processor associated with a point-of-sale (POS) system at the fueling station.

5. The method of claim 1, wherein the steps of awarding, storing, and adding the discounts-per-gallon are performed by a processor associated with a point-of-sale (POS) system at a merchant different from the fueling station, said merchant and said fueling station having a cross-marketing agreement for the discounted sale of fuel in exchange for the customer purchasing at least the first or second threshold amount of goods or services from the merchant.

6. The method of claim 5, wherein the goods and services are goods or services from a specified department of the merchant.

7. The method of claim 1, further comprising, after adding the second discount-per-gallon to the first discount-per-gallon to determine a total discount-per-gallon for the fuel, the steps of:
   determining whether the total discount-per-gallon exceeds a maximum allowable discount-per-gallon; and
   if the total discount-per-gallon exceeds a maximum allowable discount-per-gallon, limiting the total discount-per-gallon to the maximum allowable discount-per-gallon.

8. The method of claim 1, further comprising:
   storing the calculated financial discount in a redemption database.

* * * * *

UNITED STATES PATENT AND TRADEMARK OFFICE
CERTIFICATE OF CORRECTION

| | | |
|---|---|---|
| PATENT NO. | : 7,653,571 B2 | Page 1 of 1 |
| APPLICATION NO. | : 11/157578 | |
| DATED | : January 26, 2010 | |
| INVENTOR(S) | : Jacoves et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this

Twenty-third Day of November, 2010

David J. Kappos
*Director of the United States Patent and Trademark Office*